United States Patent [19]

Corwin et al.

[11] 4,247,906
[45] Jan. 27, 1981

[54] TEXT EDITING SYSTEM HAVING FLEXIBLE REPETITIVE OPERATION CAPABILITY

[75] Inventors: Daniel W. Corwin, Dunstable; Harold S. Koplow, Lynnfield; David Moros, Winchester; Paul Anagnostopoulos, Burlington, all of Mass.

[73] Assignee: Wang Laboratories, Inc., Lowell, Mass.

[21] Appl. No.: 959,704

[22] Filed: Nov. 13, 1978

[51] Int. Cl.[3] .................. G06F 3/153; G06F 3/02; G06F 9/22
[52] U.S. Cl. ................................................ 364/900
[58] Field of Search ... 364/900 MS File, 200 MS File

[56] References Cited

U.S. PATENT DOCUMENTS

| 3,501,746 | 3/1970 | Vosbury | 364/900 |
| 3,618,032 | 11/1971 | Goldsberry et al. | 364/900 |
| 3,648,271 | 3/1972 | McConnell et al. | 364/900 X |
| 3,753,233 | 8/1973 | Cardell, Jr. et al. | 364/900 |
| 3,828,323 | 8/1974 | Heitman et al. | 364/900 |
| 4,028,680 | 6/1977 | Vittorelli | 364/900 |

Primary Examiner—Melvin B. Chapnick

[57] ABSTRACT

A text-editing system having a keyboard for the input of character and text-editing operation signals, writable text storage, display and writable display storage, and control storage storing groups of microinstructions. A system control is responsive to an interrupt signal from the keyboard for decoding an input signal and deriving therefrom internal control signals for operation of the system, including modification of the display storage and text storage. Apparatus is provided for inputting the character and text-editing operation signals in either of two alternative modes. A select/store circuit is responsive to a select/store signal to select from the text storage character and operation signals modified according to a first alternative mode and to store them in a special condition storage. The system control is thereafter responsive to a recall signal to disable the keyboard interrupt, retrieve the stored signals, and operate according to them. Also, apparatus is provided for inputting the text-editing operation signals in association with a special input condition signal. Displayable representations of such operation signals are accessed, displayed and stored in text storage, but the operation is not carried out. The select/store circuit replaces the displayable representations with executable representations.

10 Claims, 18 Drawing Figures

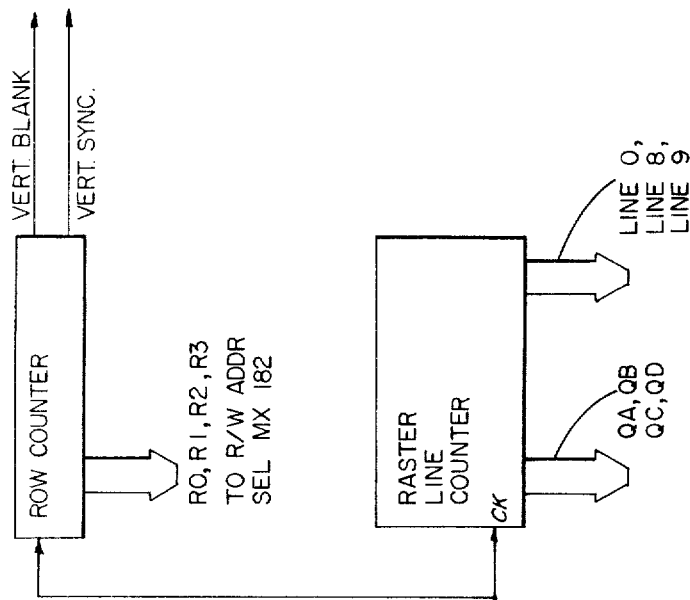
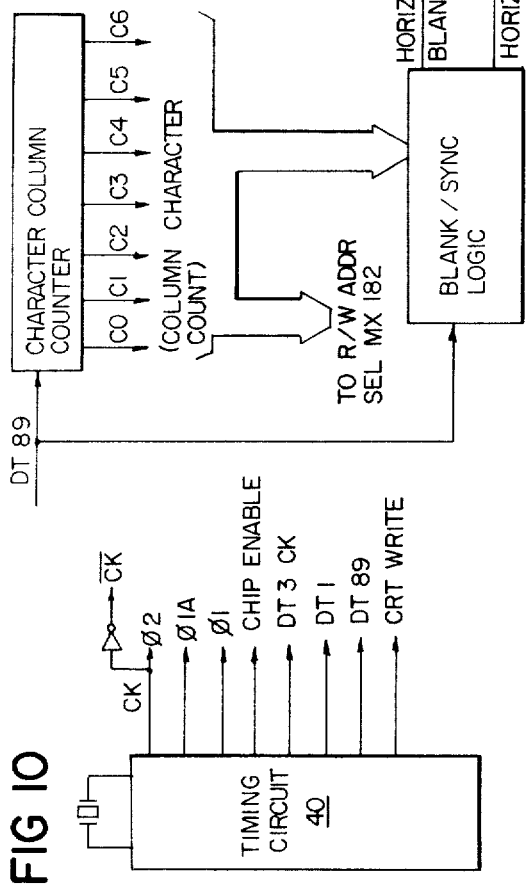
FIG 10
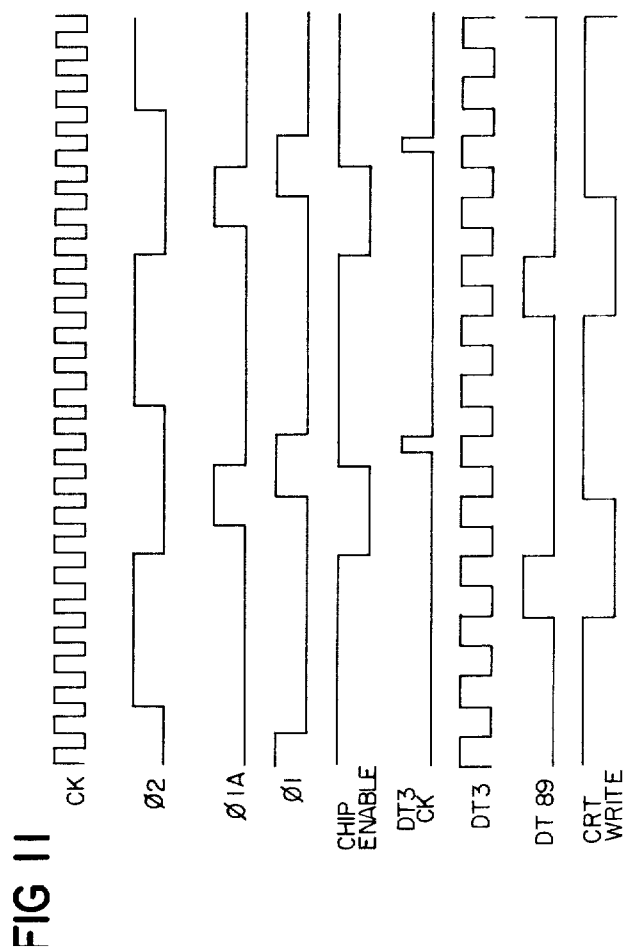
FIG 11

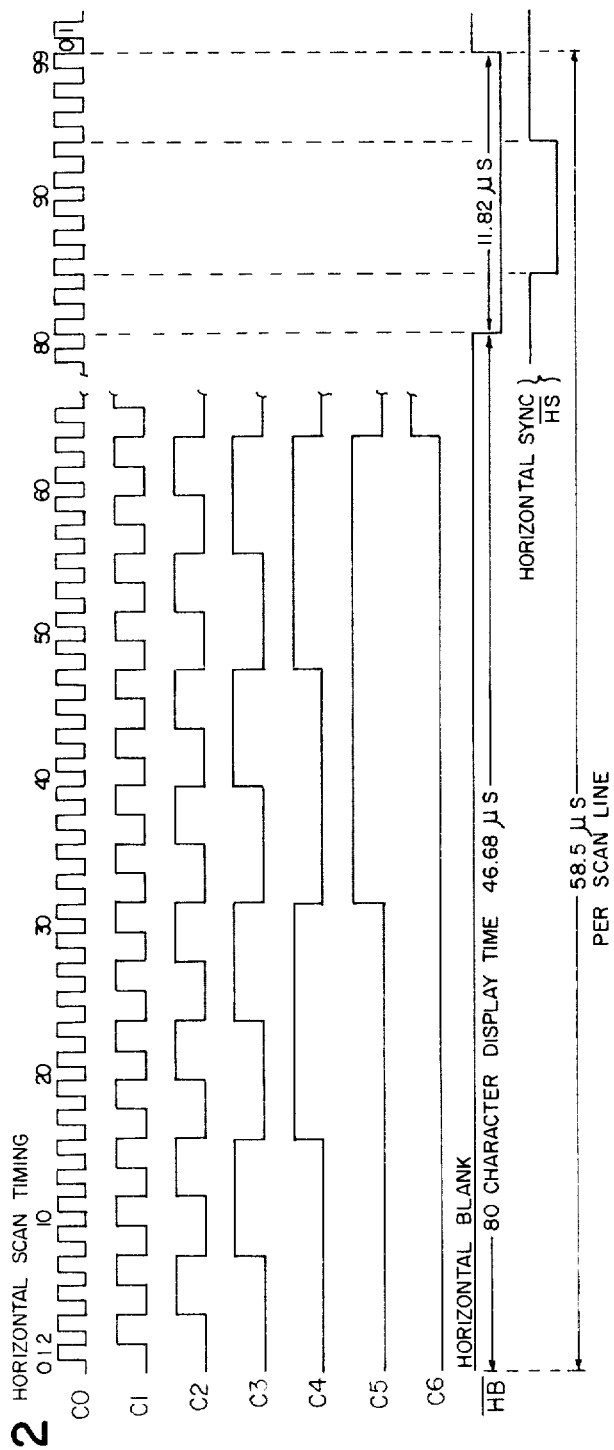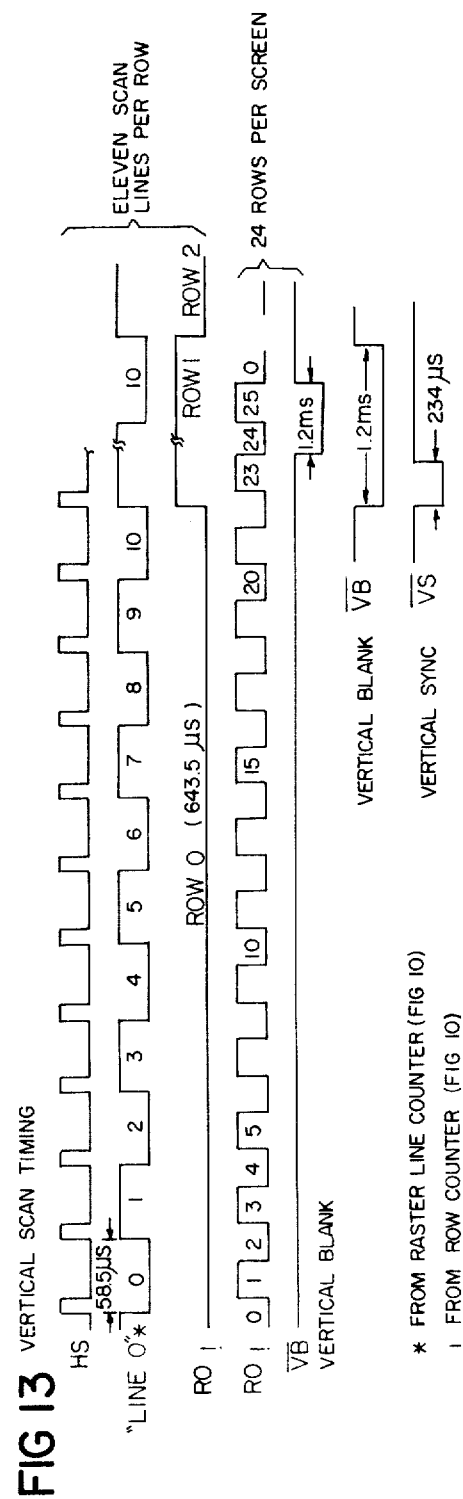

FIG 15

(Figure 15: Character encoding table mapping internal hex representation to external character/operation codes, with binary bit positions K0–K7, showing upper case, lower case, and control/operation codes. Refer to FIG. 17 for full names of operations.)

FIG 16

TABLE OF INTERNAL REPRESENTATIONS
OF CHARACTERS AND OPERATIONS

HIGH DIGIT — BINARY DIGITS / EQUIVALENT HEXIDECIMAL DIGIT

LOW DIGIT — BINARY / HEXIDECIMAL

| Binary | Hex | 0 | 1 | 2 | 3 | 4 | 5 | 6 | 7 | 8 | 9 |
|---|---|---|---|---|---|---|---|---|---|---|---|
| 0 0 0 0 | 0 | | | | 0 | @ | P | °p | p | CAN | CN |
| 0 0 0 1 | 1 | CTR | | ! | 1 | A | Q | a | q | CMD | CW |
| 0 0 1 0 | 2 | TAB | | " | 2 | B | R | b | r | EX | CS |
| 0 0 1 1 | 3 | RET | | # | 3 | C | S | c | s | INS | CE |
| 0 1 0 0 | 4 | IND | | $ | 4 | D | T | d | t | DEL | BKS |
| 0 1 0 1 | 5 | DAL | | % | 5 | E | U | e | u | PVS | UND |
| 0 1 1 0 | 6 | | | & | 6 | F | V | f | v | NXS | FMT |
| 0 1 1 1 | 7 | | | ' | 7 | G | W | g | w | PAG | SCH |
| 1 0 0 0 | 8 | | | ( | 8 | H | X | h | x | fmt | REP |
| 1 0 0 1 | 9 | | | ) | 9 | I | Y | i | y | sch | COP |
| 1 0 1 0 | A | | | * | : | J | Z | j | z | rep | |
| 1 0 1 1 | B | STP | | + | ; | K | [ | k | | cop | |
| 1 1 0 0 | C | NOT | | , | | L | | l | | MOV | |
| 1 1 0 1 | D | mg | | - | = | M | ] | m | | MG | |
| 1 1 1 0 | E | | | | . | N | | n | | GO | |
| 1 1 1 1 | F | | | / | ? | O | | o | | SC | S/S |

BINARY DIGITS / EQUIVALENT HEXIDECIMAL DIGIT (REFER TO FIG. 17 FOR FULL NAMES OF OPERATIONS)

FIG 17

| I (DISPLAY-ABLE) | II ABBREVIATION | III (NOT DISPLAY-ABLE) | IV NAME OF OPERATION | V "KEY-NAME" |
|---|---|---|---|---|
|  | BKS | 94 | BACKSPACE | (-BACKSPACE-) |
|  | CAN | 80 | CANCEL | (-CANCEL-) |
|  | CMD | 81 | COMMAND | (-COMMAND-) |
| 01 | CTR |  | CENTER | (-CENTER-) |
|  | cop | 8B | COPY (L.C.) | (-COPY-) |
|  | COP | 99 | COPY (U.C.) | (-SUPER-COPY-) |
|  | CE | 93 | CURSOR EAST (RIGHT) | (-EAST-) |
|  | CN | 90 | CURSOR NORTH (UP) | (-NORTH-) |
|  | CS | 92 | CURSOR SOUTH (DOWN) | (-SOUTH-) |
|  | CW | 91 | CURSOR WEST (LEFT) | (-WEST-) |
| 05 | DAL |  | DECIMAL TAB | (-DEC-TAB-) |
|  | DEL | 84 | DELETE | (-DELETE-) |
|  | EX | 82 | EXECUTE | (-EXECUTE-) |
|  | fmt | 88 | FORMAT (L.C.) | (-FORMAT-) |
|  | FMT | 96 | FORMAT (U.C.) | (-EDIT-FORMAT-) |
|  | SC | 8F | SPECIAL INPUT CONDITION | (-GLOSSARY-) |
|  | GO | 8E | GO TO PAGE | (-GO-TO-PAGE-) |
| 04 | IND |  | INDENT | (-INDENT-) |
|  | INS | 83 | INSERT | (-INSERT-) |
| 0D | mg |  | SWITCH DOCUMENT (L.C.) | (-MERGE-) |
|  | MG | 8D | DON'T SWITCH DOCUMENT (U.C.) | (-DON'T-MERGE-) |
|  | MOV | 8C | MOVE | (-MOVE-) |
| 0C | NOT |  | NOTE | (-NOTE-) |
|  | NXS | 86 | NEXT SCREENLOAD | (-NEXT-SCRN-) |
|  | PVS | 85 | PREVIOUS SCREENLOAD | (-PREV-SCRN-) |
|  | PAG | 87 | PAGE | (-PAGE-) |
| 03 | RET |  | RETURN | (-RETURN-) |
|  | rep | 8A | REPLACE (L.C.) | (-REPLC-) |
|  | REP | 98 | REPLACE (U.C.) | (-GLOBL-REPLC-) |
| 20 | SP |  | SPACE BAR |  |
|  | sch | 89 | SEARCH (L.C.) | (-SEARCH-) |
|  | SCH | 97 | SEARCH (U.C.) | (-SEARCH-ALL-) |
| 0B | STP |  | STOP CODE | (-STOP-) |
| 02 | TAB |  | TABULATION | (-TAB-) |
|  | UND | 95 | UNDERSCORE | (-UNDERSCORE-) |

FIG 18

TABLE OF INTERNAL REPRESENTATIONS AND CORRESPONDING DISPLAYABLE GRAPHICS AND CHARACTERS

| LOW DIGIT BINARY | HEX | HIGH DIGIT BINARY: 000 / HEX: 0 | 001 / 1 | 010 / 2 | 011 / 3 | 100 / 4 | 101 / 5 | 110 / 6 | 111 / 7 |
|---|---|---|---|---|---|---|---|---|---|
| 0 0 0 0 | 0 | | | | 0 | @ | P | ō | p |
| 0 0 0 1 | 1 | ♦ | | ! | 1 | A | Q | a | q |
| 0 0 1 0 | 2 | ▸ | | " | 2 | B | R | b | r |
| 0 0 1 1 | 3 | ◂ | | # | 3 | C | S | c | s |
| 0 1 0 0 | 4 | → | | $ | 4 | D | T | d | t |
| 0 1 0 1 | 5 | ← | | % | 5 | E | U | e | u |
| 0 1 1 0 | 6 | | | & | 6 | F | V | f | v |
| 0 1 1 1 | 7 | | | ' | 7 | G | W | g | w |
| 1 0 0 0 | 8 | | | ( | 8 | H | X | h | x |
| 1 0 0 1 | 9 | | | ) | 9 | I | Y | i | y |
| 1 0 1 0 | A | | | * | : | J | Z | j | z |
| 1 0 1 1 | B | − | | + | ; | K | [ | k | |
| 1 1 0 0 | C | ‖ | | , | | L | | l | |
| 1 1 0 1 | D | ↕ | | − | = | M | ] | m | |
| 1 1 1 0 | E | | | . | | N | | n | |
| 1 1 1 1 | F | | | / | ? | O | | o | |

TEXT EDITING SYSTEM HAVING FLEXIBLE REPETITIVE OPERATION CAPABILITY

Text-editing systems having keyboards for the input of text characters and text-modifying operations, and having CRT displays for the display of entered text as modified by operations thereon, are in general well known, and have provided convenient and efficient means for typing, editing and printing text.

However, it has been found that in typical use of such systems, certain repetitive operations are time-consuming and inefficient. For example, one or more particular strings of characters may be entered very frequently during use of the system. Such a case occurs in typing correspondence, for which the name of a particular city or state may be typed in addresses many times a day. Frequently, also, a substantial portion of the correspondence typed on a particular system may be addressed to a particular person or company, whose name and address may be typed many times. It would represent considerable saving of time to the operator to be able to enter the city or state, or the name and address, without entering each character comprising it each time the entry is wanted.

Further, it has been found that in typical applications, a particular sequence of operations and characters may be in frequent use. For example, in revising a lengthy text, the author may decide to replace a particular word or phrase, occurring many times in the document, by another word or phrase. The operator of the text-editing system accomplishes this revision, typically, by locating the first place in the text to be corrected, actuating a key which initiates the "replace" operation, then actuating keys to indicate what portion of the displayed text is to be replaced, and finally typing in a string of characters to be entered in place of the removed text, followed typically by actuation of a key denominated "execute" or the equivalent. If the same revision is made many times throughout a document, this sequence of actions must be repeated for each occurrence, which is time-consuming and tedious. It would be more efficient to be able to accomplish the revision by actuation of only one or two keys at each instance of the replacement.

However, the particular strings of characters that are frequently typed depend on the particular application of the individual system, and may vary from time to time. Consequently it would not be practical to manufacture a text-editing system having the capability of typing "Massachusetts" in response to actuation of a single key, for example, because a user in California might have no use for such a feature. Similarly, a particular sequence of steps (such as those comprising the "replace" operation described above) may be repeated a dozen or more times in revising a particular document, but may thereafter never be wanted again. It is therefore equally impractical to attempt to foresee and provide particular editing sequences.

It is therefore an object of the present invention to modify an existing generally well-known type of text-editing system to provide a flexible capability for the user to enter sequences of characters and operations in a special mode for storage and later repetitive execution as needed.

It is also an object of the present invention to provide such capability for use by the usual operator of the system, using the existing means for entering and displaying text and operations, without major modification of the design of the system.

In entering such sequences of characters and operations, it is desirable that the user be able to edit the entries before final storage for later execution, for instance for the correction of typing errors, or to alter the sequence of operations. In the ordinary text-editing system, many operations input through the keyboard result in alterations such as rearrangement of the displayed text but are not themselves otherwise displayable. However, the system user depends upon the display in editing input material. It is therefore an object to permit the display of all elements in such entered sequences in a manner permitting them to be edited.

When a lengthy sequence of operations and characters is entered and displayed, it is desirable to be able to arrange the present display of the sequence in a manner that is clear and convenient for the user, by operating on the display with tabs and returns, for example. However, such tabs and returns are not intended to affect the display of the text at the later time when the sequence of operations is recalled and executed. On the other hand, other tabs and returns may themselves form part of the sequence intended for later recall. Similarly, when a lengthy sequence of operations and characters is entered and displayed, it is often an aid to the operator to display comments regarding the entered sequence, for the convenience and better understanding of the operator. However, such comments are not intended to be displayed or to form part of the text at a later time when the sequence is recalled for execution, while other entered text forms part of the present display and is also intended to be displayed at a later time. It is therefore an object of this invention to provide means for selecting and storing signals representative of selected operations and characters for later recall, selecting those to be stored responsive to a displayable mode distinction.

The present invention is an improvement of a text-editing system of an existing type, whose internal control and storage means have structural limitations such as characteristic word size, data and address buses adapted to transmit data of such word size, and the like. It is desirable to be able to modify such a system to provide the advantages of the invention within such limitations, avoiding the redesign of the basic system. Therefore, it is a further object of this invention to provide the described advantages utilizing the general structure of an existing system, including characteristic data word length, and to transmit, store and respond to the information relating to the storage of a particular character or operation without requiring additional fields in the character code, and without requiring additional operational cycles for the internal transfer of such information.

BRIEF SUMMARY OF THE INVENTION

According to the invention, an improvement is provided in a text-editing system having a keyboard providing a plurality of manually actuated alpha-numeric character keys, a plurality of manually actuated text-modifying operational keys, and signal input means coupled to the keys for inputting to the system an interrupt signal and a key-specific signal in response to actuation of a key. Input buffer storage is connected to the signal input means for holding the input key-specific signals. The system further has writable text storage, display means for display of visual representations of characters corresponding to the alpha-numeric character keys, and display control means connected to the display means and having writable display storage. A control storage stores groups of microinstructions. System control means is connected to the input buffer storage, text storage, display storage, and control storage, and is responsive to the interrupt signal for fetching from the input buffer storage and decoding an input signal and deriving therefrom internal control signals.

The system control means is responsive to a key-specific signal corresponding to a text-modifying operation key to derive internal control signals for addressing the control storage to access particular microinstructions corresponding to the operation, for operating according thereto to carry out the operation specified by the text-modifying operational key, and for modifying the text storage and display storage in accordance with the operation.

According to the improvement, the keyboard further provides a special input condition key, the signal input means being responsive thereto to provide an interrupt signal for the system control means and a special input condition signal to the input buffer storage. The system further comprises read-only special condition representation storage containing a set of text-modifying operation key-specific signals and a set of corresponding displayable special condition representations; the system control means is connected to the special condition representation storage for addressing elements of the sets. The system further comprises a special condition flag register for storing a special condition flag, the system control means being responsive to a special input condition signal to set the special condition flag. The system control means is responsive to an input signal corresponding to one of the text-modifying operation keys and to the set condition of the special condition flag to derive internal control signals for addressing the stored set of displayable special condition representations to access a special condition representation corresponding to the input signal, and for storing the special condition representation into the text storage and display storage.

In preferred embodiments, the keyboard text-modifying operation keys include an underscore key. The system control means comprises decoding means responsive to the interrupt signal for fetching from the input buffer storage and decoding an input signal and deriving therefrom internal control signals; address control and read/write control means connected to the text storage, display storage, and control storage, and responsive to the derived internal control signals for controlling the addressing, reading and writing of the text storage, display storage, and control storage; and processor means connected to the control storage for operating according to accessed groups of microinstructions to carry out operations specified by the text-modifying operational keys, and connected to the address control and read/write control means for modifying the text storage and display storage in accordance with the operations. The system control means provides current position storage and is responsive to the input signals for updating the content of the current position storage.

The system control means is responsive to a character key-specific signal and to the content of the current position storage to derive internal control signals for addressing the text storage and display storage at a current position address and writing a corresponding character representation therein. The system control means is in particular responsive to the key-specific signal corresponding to the underscore key and to the content of the current position storage to derive internal control signals for addressing the text storage and display storage at a current position address and for modifying the character representation stored at that address, the display control means being responsive to the modified character representation for displaying the character in underscored format.

According to the invention, the keyboard further provides a select/store key, the signal input means being coupled thereto for inputting an interrupt signal and a select/store signal to the system. The system further comprises writable special condition storage connected to the system control means, and read-only key-name storage containing a set of displayable key-name representations each corresponding to a text-modifying operation key and each composed of a plurality of character representations, the addressing means being further connected to the key-name storage for addressing elements of the set.

The system control means is responsive to a signal corresponding to one of the text-modifying operations and to the set condition of the special condition flag to derive internal control signals for controlling the address control and read/write control means to address the stored set of key-name representations to access a displayable key-name representation corresponding to the operation, and to store the key-name representation into the text storage and display storage. The system control means is responsive to the select/store signal to derive internal control signals for addressing the text storage and retrieving stored character representations and key-name representations therefrom, the system control means being responsive to a retrieved modified character representation to derive internal control signals for selecting and storing the character representation in the writable special condition storage.

The system control means is further responsive to a retrieved key-name representation composed of modified character representations to address the key-name storage and retrieve a corresponding text-modifying operation signal therefrom and to store the retrieved signal in the writable special condition storage.

The system further comprises a writable index of the special condition storage. The system control means is responsive to particular key-specific signals defining an index character, retrieved from the writable text storage responsive to the select/store key, to derive internal control signals for controlling the address control and read/write control means to store the index character into the index in association with the indexed writable special condition storage address of the selected character representations and operation signals. The system control means is thereafter responsive to the input of the index character and to the set condition of the special condition flag to derive internal control signals for controlling the address control and read/write control means to address the special condition storage at the indexed address, to retrieve the stored selected character representations and operation signals and to apply them to the decoding means for control of the system.

BRIEF DESCRIPTION OF THE DRAWING

Other objects, features and advantages will appear from the following description of a preferred embodiment of the invention, taken together with the attached drawings thereof, in which:

FIG. 10 shows the generation of timing and count signals used in the system;

FIG. 11 is a timing diagram of the timing signals of FIG. 10;

FIG. 12 is a timing diagram of the horizontal scan timing of the display means of FIG. 2 generated as shown in FIG. 10;

FIG. 13 is a timing diagram of the vertical scan timing of the display means of FIG. 2 generated as shown in FIG. 10;

FIG. 15 is a table listing the conversion between external signals and internal representations of characters and text-modifying operations;

FIG. 16 shows the internal representations in the form of words of binary bits;

FIG. 17 lists the keys of the keyboard with their abbreviated names and their "key-names"; and FIG. 18 lists the codes that can be stored in the character portion of the display storage, and the corresponding display symbols derived from the character generator.

DETAILED DESCRIPTION OF THE INVENTION

Figure 1:
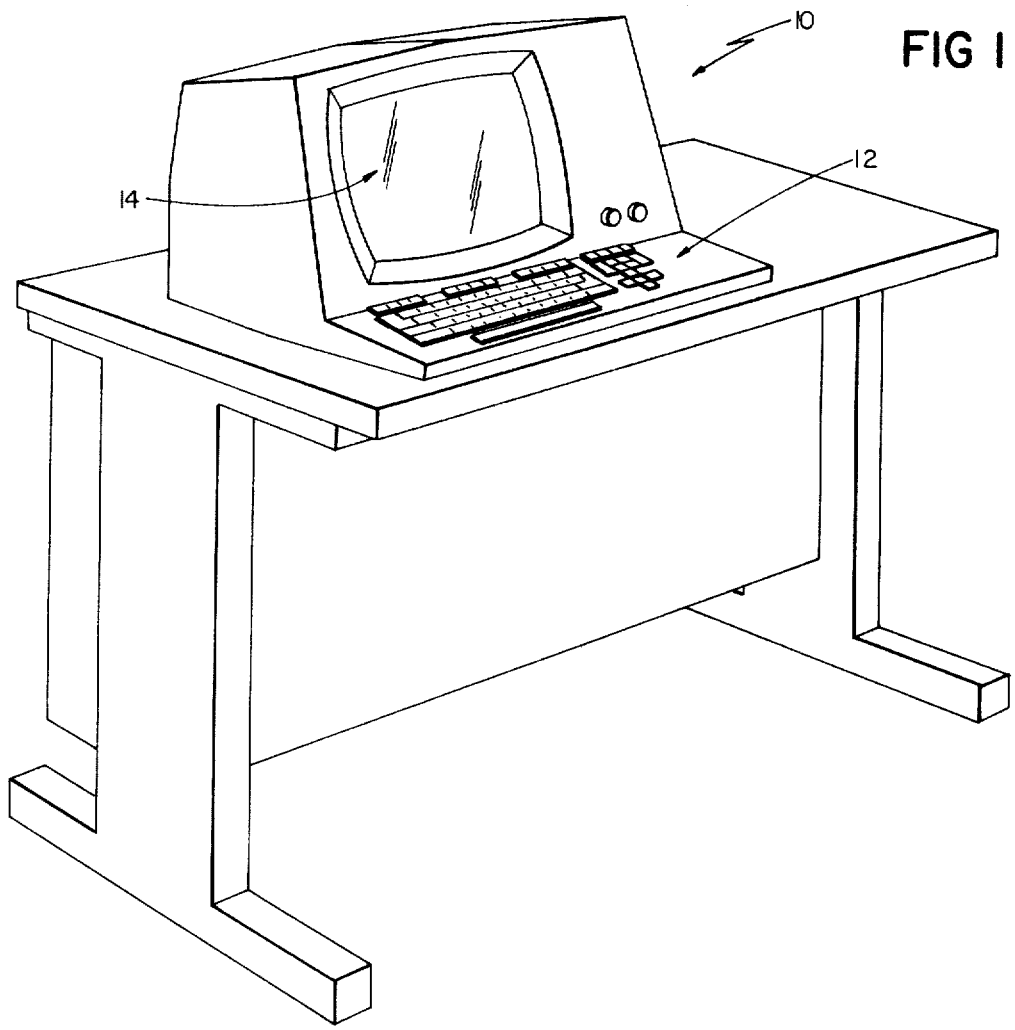
FIG. 1 is a view of the exterior of a text editing system of the type modified according to the invention.

Referring now to the drawing, and particularly to FIG. 1, a text-editing system of the type modified according to the invention is housed in a housing 10, and provides a keyboard 12 for the input of characters and of text-modifying operational signals, and a display 14, which is a conventional cathode-ray screen, for the display of the input text, as modified according to the operational signals.

Figure 2:
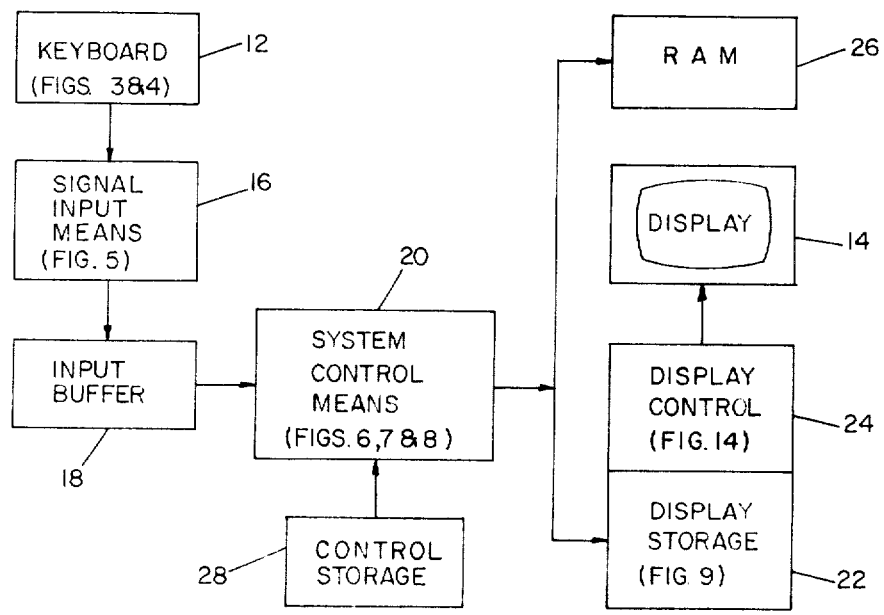
FIG. 2 is a diagrammatic view of the internal structure of such a system.

Referring now to FIG. 2, the internal structure of the text-editing system is shown in diagrammatic form. Generally, key-specific signals representing text and text-modifying operations are input from keyboard 12, which is coupled to signal input means 16, to an input buffer 18, and from buffer 18 to the system control means 20. System control means 20 decodes the input signals, and in response to the decoded values controls the storage of text in random access memory 26. Also in response to the decoded values, system control means 20 controls the storage of signals in display storage 22. The contents of display storage 22 are applied to display control circuit 24, which controls the display 14. In response to input text-modifying operation signals, system control means 20 accesses groups of instructions stored in control storage 28, and operates in accordance with such instructions to edit the stored and displayed text.

Text-editing systems of this general kind are well known. A printer may be connected on-line to the system, or alternatively, the edited text may be stored on a medium such as a magnetic tape or disk which may be physically transferred to the control system of a printer, a telecommunications system, or the like, all in a manner forming no part of the present invention.

The particular system described herein is of the type known as "document-oriented" (as contrasted with "page-oriented" systems, for example). Text is considered to be divided into "documents" of arbitrary length. A document may comprise, for example, a short letter of less than a typewritten page, or may comprise a treatise of many pages, limited only by the total available text storage. By means not relevant to the present invention, when the operator initiates the input of a document, the system control means automatically assigns a "document number" to the document, displaying such number on the display, and stores the number in an internal index together with the address of the portion of text storage at which the text identified by that document number is stored. The system user at any time thereafter can input the document number together with appropriate instructions, which (by means not relevant to the present invention) will cause the system to print the document, to delete it, or to display it, a screenload at a time, for the purpose of editing operations.

Figure 3:
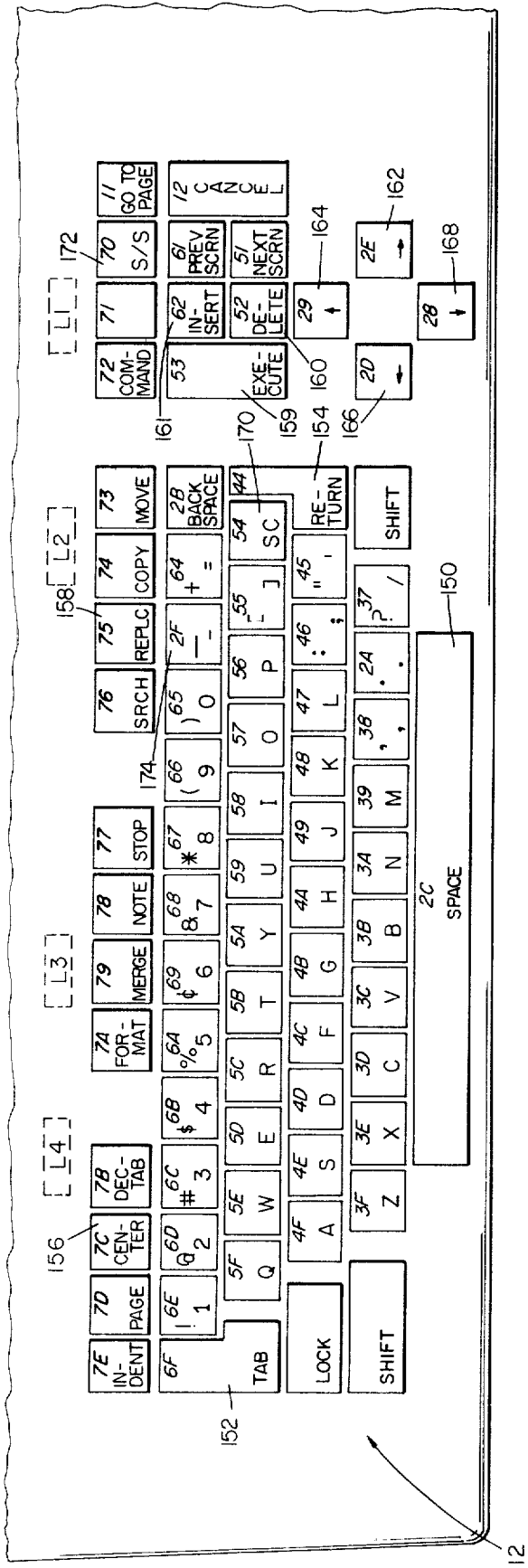
FIG. 3 is a view of the upper surface of the keyboard of FIG. 1, showing the key symbols and the signals input by the keys.
Figure 4:
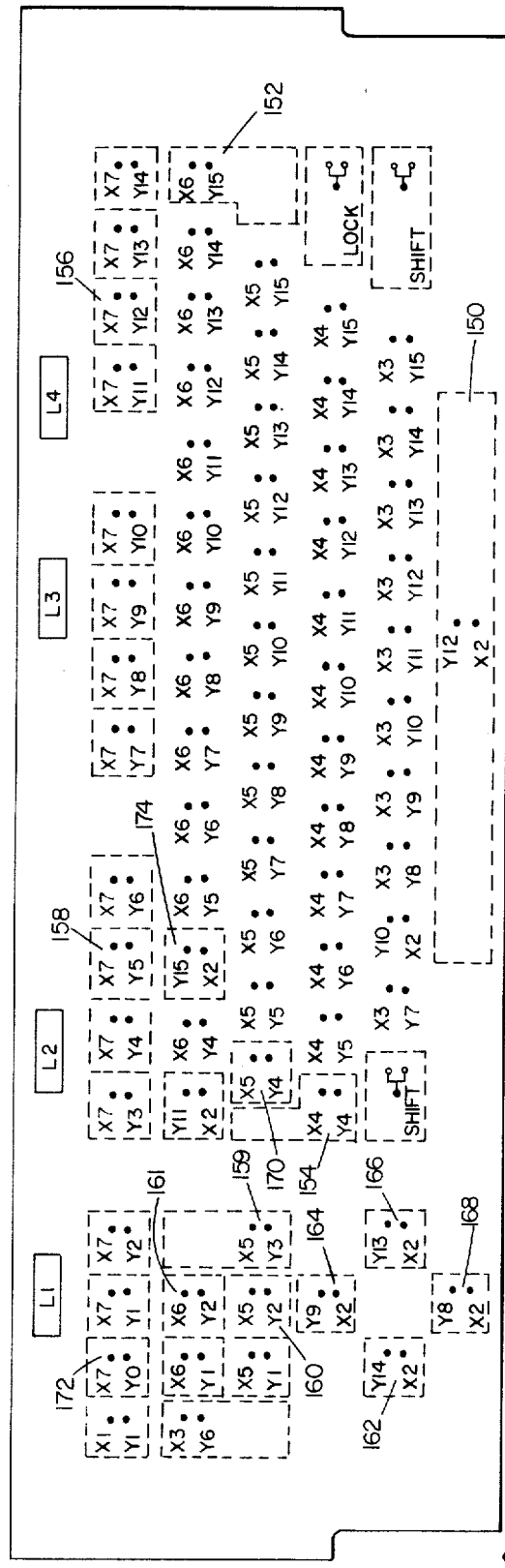
FIG. 4 is a view of the lower surface of the keyboard, showing the switching connections for each key.
Figure 5:
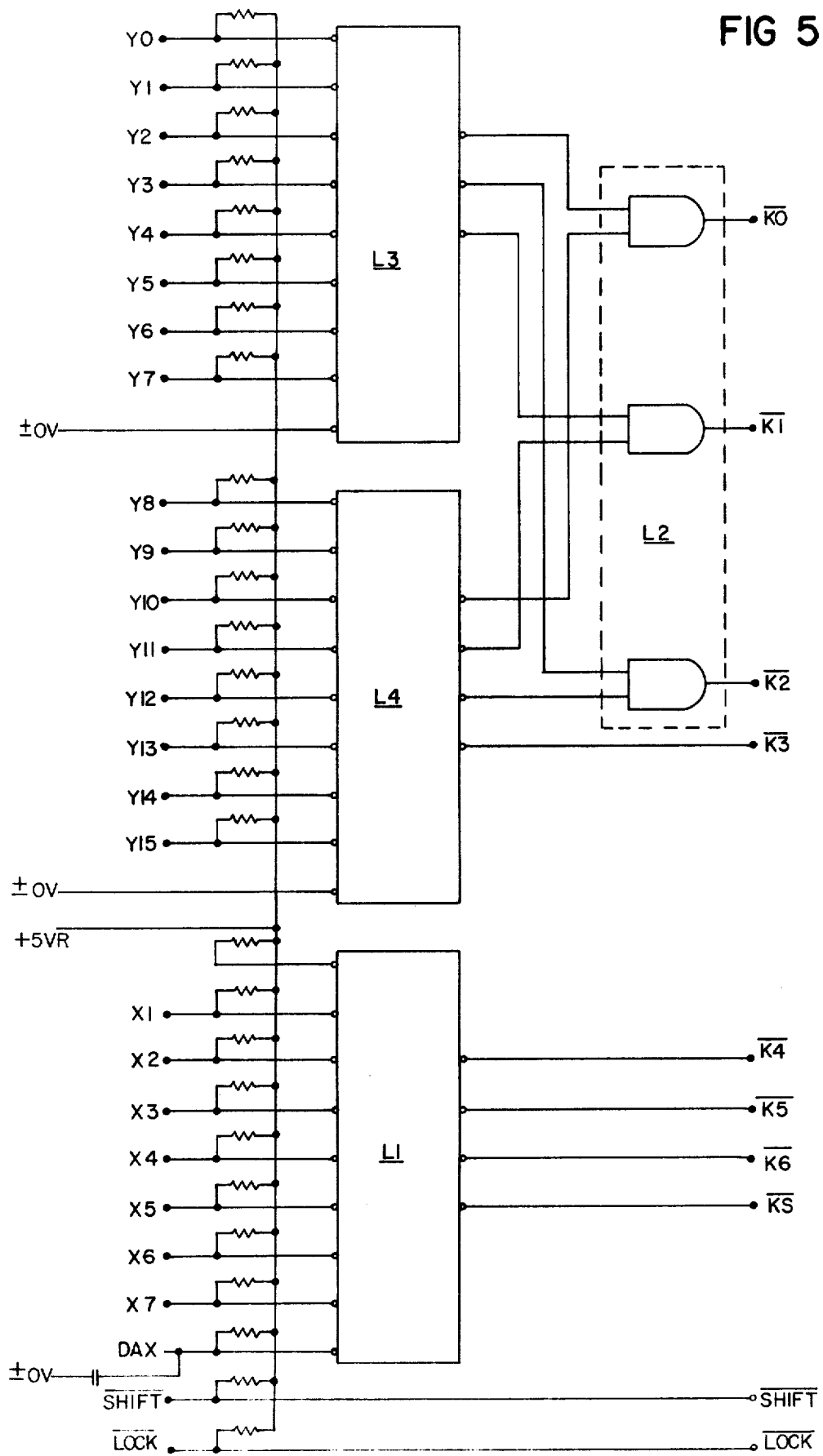
FIG. 5 shows the signal input means of the system.

FIGS. 3, 4 and 5 show the structure associated with the generation of key-specific signals. Referring first to FIG. 3, keyboard 14 provides a plurality of keys, including conventional alpha-numeric character keys for inputting signals corresponding to characters (such as a, b, c, or 1, 2, 3), and additional operational keys. The operational keys include keys for inputting signals representing conventional typewriter operations such as "space" (key 150), "tab" (key 152), or "return" (key 154), as well as additional keys for inputting signals representing editing operations commonly employed in text-editing systems, such as "center" (key 156), "replace" (key 158), "delete" (key 160), and the like. The typewriter operations and the operations characteristic of text-editing systems are here classed together as "text-modifying operations". Among the operational keys are four keys which move the "cursor" (position indicator) graphic on the display, called "cursor east" (key 162), "cursor north" (key 164), "cursor west" (key 166) and "cursor south" (key 168). The cursor will be discussed further in what follows. In addition, keyboard 12 provides a "special condition" key 170 (S.C.) and a "select/store" key 172 (S/S) whose functions will be explained in what follows.

Each key, when actuated, closes switch contacts which are coupled to signal input means 16 to generate a key-specific input signal, indicated in italic figures on the keys of FIG. 3. The shift and lock keys generate a separate input. Signals representative of upper case letters or symbols are generated by actuating the shift key followed by the letter or symbol key.

FIG. 4 shows the particular switching connections that are made by depressing each key shown in FIG. 3. Signal input means 16 responds to the switching connections as shown in FIG. 5 to provide a representation of the key as a combination of the inputs K0–K6, together with a keyboard strobe signal KS, and shift and lock inputs, which generate the eighth bit (K7) of the representation. Each key-specific input is shown in association with its key in FIG. 3, and is referred to as the "external" representation of the key.

Figure 6:
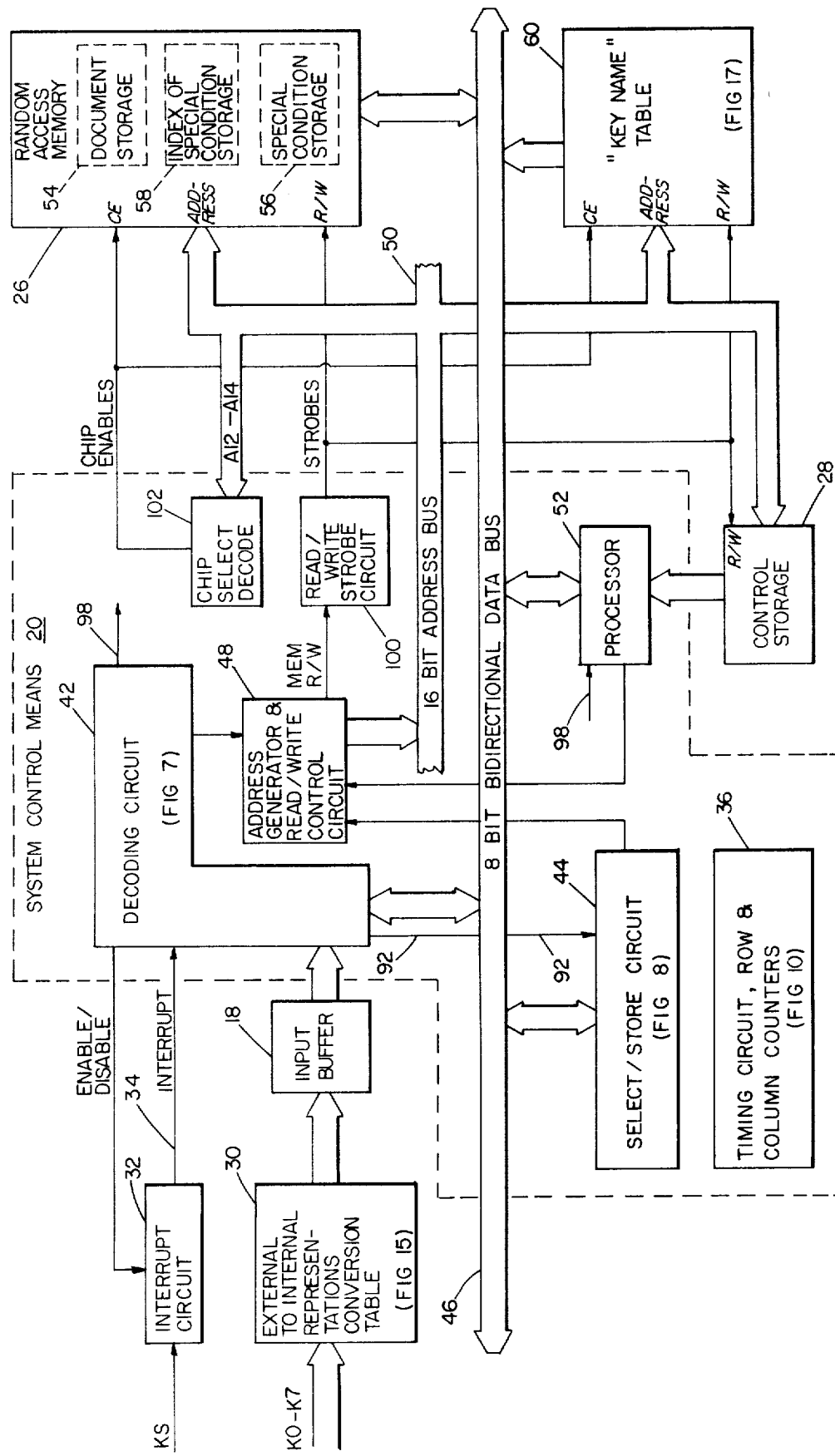
FIG. 6 is a diagrammatic showing of portions of FIG. 2, in greater detail.

Referring now to FIG. 6, portions of the structure of the system shown diagrammatically in FIG. 2 are shown in more detail, in particular, the system control means 20 and the RAM 26.

System control means 20 includes a timing circuit 40 and row and column counters. Timing circuit 40 and the row and column counters are shown in FIG. 6 as block 36, and are shown in more detail in FIG. 10. The operations of the entire system, including the system control means 20, are timed by signals from timing circuit 40 (FIG. 10), which are employed to clock signals through the buffers, registers and other circuit elements in a manner that is well known in the art and forms no part of the invention. The outputs of the row and column counters are used in controlling the display. The principal timing signals employed, and their relationship to one another, are shown in the timing diagram of FIG. 11. The particular timing inputs to the circuitry of the system have been omitted in the figures, except in connection with the generation of the display.

Referring now again to FIG. 6, the K0-K7 inputs ("external" representation) from signal input means 16 are applied to block 30, containing an external to internal representation conversion table. The "external" representation, in two bytes (high and low order) each comprising four binary elements is applied to address the table, and an internal representation is read out. The internal representation also comprises two bytes, each of four binary elements.

Referring now to FIGS. 15, 16, and 17, FIG. 15 shows in tabular form the contents of block 30 of FIG. 6. The external representation bytes are used to locate the square containing either the alpha-numeric character or an abbreviation of the text-modifying operation, together with the two-byte internal representation, in hexidecimal form. The names of the operations are abbreviated for reasons of space in the figure.

Referring next to FIG. 16, the internal representations are shown in both binary and hexidecimal form, with the corresponding alpha-numeric characters and abbreviated names of operations. In FIG. 17, the abbreviated names of text-modifying operations are shown (in column II of the Figure). The full name of the operation is given in column IV of FIG. 17. Certain of the operations (e.g. "replace") appear twice, once designated "L.C." and once designated "U.C." The two forms represent different operations, whose particular features are not relevant to the present invention. The designation "L.C." (lower case) means that the appropriate key was actuated without the shift key, whereas "U.C." (upper case) means that the shift key was actuated. As has been explained, the shift key inputs a separate signal which is combined with the operation key signals to form the external representation of the operation.

The internal representation of each operation is given in either column I or column III of FIG. 17, corresponding to operations have displayable graphics and operations not having such graphics. As is seen from the Figure, representations having a high-order byte running from 0 to 7 (bit 7=0) have an associated displayable graphic, while representations having a high byte of 8 or 9 (bit 7=1) have no displayable graphic. Thus, for example, when the text-modifying operation key 156 ("center") is actuated (internal representation hexidecimal "01"), the "center" graphic is displayed, and at the same time the centering operation is carried out, by means to be described. When a non-displayable text-modifying operation signal (e.g. GO TO, internal representation hexidecimal "8E") is input, no graphic is displayed, although the operation is carried out.

The relevance of the content of column V of FIG. 17 will be explained in what follows.

Referring now again to FIG. 6, the internal representation read out from block 30 is stored in input buffer 18, while the KS (keyboard strobe) signal is input (together with a timing signal, not shown) to interrupt circuit 32, which in a known manner generates an interrupt signal which is input on line 34 to system control means 20.

Still referring to FIG. 6, the system control means 20 comprises a decoding circuit 42 which is connected to the eight bit bidirectional data bus 46. In addition, decoding circuit 42 is connected to the address generator and read/write control circuit 48, which is coupled to a sixteen bit address bus 50. Decoding circuit 42, which is seen in more detail in FIG. 7, decodes the internal representations of the key-specific input signals and in response thereto generates internal control signals for the operation of the system, as will be explained in more detail in what follows.

System control means 20 further comprises a processor 52, which is coupled to the control storage 28. When signals representative of text-modifying operations are input to decoding circuit 42, the internal control signals that are derived in response thereto control the address bus to address control storage 28, and give control to the processor 52. Processor 52 thereafter operates according to stored groups of instructions from control storage 28 to carry out the operation specified by the input signals. Processor 52 controls the data bus and the address generator and read/write control circuit 48 to alter the content of RAM 26 and of display storage 22 in accordance with such operations. The structure of the processor and the details of the instructions stored in control storage 28 are a matter of design choice and form no part of the present invention.

Among the operations performed by processor 52, in a known manner, is the "underscore" operation, in response to actuation of key 174, in combination with the shift key. In response to the internal representation (1001 0101) of the underscore key, appropriate instructions in control storage 28 are addressed and executed by processor 52 to address RAM 26 and display storage 22 at the location indicated by the current cursor position. If the internal representation stored at that location has a configuration having a numerical value greater than 0000 1111, and less than 1000 0000, the processor controls the read/write control means to write "1" into the eighth bit of the two-byte location. Referring to FIG. 16, it is seen that a configuration meeting these criteria is a representation of a character. All others are representations of operations, some of which have associated display graphics. Therefore, no display graphic can be underscored. As will be seen in connection with the more detailed description of the internal representations, a character that can be underscored is specified by the first seven bits (including upper or lower case) of the eight-bit representation; the eighth bit represents presence (1) or absence (0) of the underscore. The relevance of the underscore will appear in what follows.

Random-access memory 26 is coupled to data bus 46, and is addressed by address bus 50. RAM 26 includes a specific region designated "document storage" 54, which is that portion of RAM 26 in which text is stored, organized as "documents".

The CRT display 14 (FIG. 2) displays the content of display storage 22, which at any one time holds one screen-load of the material stored in document storage 54. The display is organized in eighty columns (horizontal positions) and twenty four rows (vertical positions). The display is generated by a conventional raster scan; a row comprises eleven horizontal scan lines. Each display graphic (character or other symbol) is made up of a pattern of selected dots in an eight by eight dot matrix. In addition to the eight scan lines of a character, two further scan lines are used to display a "cursor" symbol beneath the character, when required, and the eleventh line is blanked for spacing between rows. Sync and blanking signals for controlling the raster scan are derived from the column and row counts, which in turn are derived from one of the basic system timing signals, as shown in FIG. 10. The sync and blanking signals are seen in the timing diagrams of FIGS. 12 and 13.

The sync and blanking signals are combined with a video signal (obtained in a manner to be described) from a video shift register (FIG. 14) and applied to the input to the CRT to produce the desired visual display in a known manner. The generation of the display will be described in more detail in what follows.

According to the invention, the text editing system includes additional structure which provides the system with the flexible capability of storing sequences of characters and/or operations, selected by the system user, for recall and use in editing other material at a later time, permitting repetitive use of such sequences.

The invention has two aspects, corresponding to the different problems of handling text and operational input.

In a first aspect, the additional structure comprises a select/store (S/S) key 172 on keyboard 12, by which the system user initiates selection and storage of a sequence of characters and/or operations for later recall. The additional structure further comprises select/store means responsive to key 12 and to a first condition of one portion of the internal representation of an input signal for selecting and storing such signal, while bypassing signals having a second condition of such portion. The two conditions are recognized by the display control to display the input signals in either of two visually distinct modes, permitting the user to enter and view comments as well as inputs intended for later recall.

In a second aspect, the additional structure of the system provides means for inputting key-specific signals corresponding to text-modifying operations in association with a special input condition signal, and means for providing a special input condition representation of such signals in accordance with the special input condition signal, the special input condition form being displayable. The select/store means is responsive to actuation of the select/store key 172 for selecting and storing signals representing the text-modifying operations.

Finally, the additional structure comprises means for recalling a stored sequence for use in controlling the system.

Referring again to FIG. 6, the system control means 20 comprises a select/store circuit 44 for selecting and storing sequences for later recall and execution. The operation of this circuit will be described in more detail in connection with FIG. 8.

Further, RAM 26 includes, in addition to document storage 54, a special condition storage 56 for storing sequences intended for later recall and execution, and an index of special condition storage 56.

In addition, the system provides a read-only storage block 60 called the "key-name table", which is coupled to data bus 46, and is addressable by address bus 50. The contents of the key-name table are shown in tabular form in FIG. 17. Referring first to FIGS. 15 and 16, for reasons of space in the drawing, abbreviations of the designations of the operational keys are employed in these figures. In column II of FIG. 17, these abbreviations are shown with the full designation of each operational key in column IV. In addition, the internal representations of the keys are listed, divided into two columns corresponding to operational keys having associated displayable graphics (column I), and operational keys having no displayable graphic (column III).

Column V of FIG. 17 lists the "key-name" of each key. The "key-name" is the special input condition representation of the key. The format shown, in which a sequence of upper-case letters is enclosed between two hyphens and then between two parentheses, is a part of the key-name. When storage block 60 is addressed by the internal representation of the key (columns I and III), the corresponding key-name is read out from column V. A single (two-byte) internal representation of an operational key is thereby replaced by a sequence of internal representations of a plurality of upper case characters, enclosed between hyphens and parentheses. All of the elements making up a "key-name" are displayable. The purpose of the key-name table will be explained in what follows.

Figure 7:
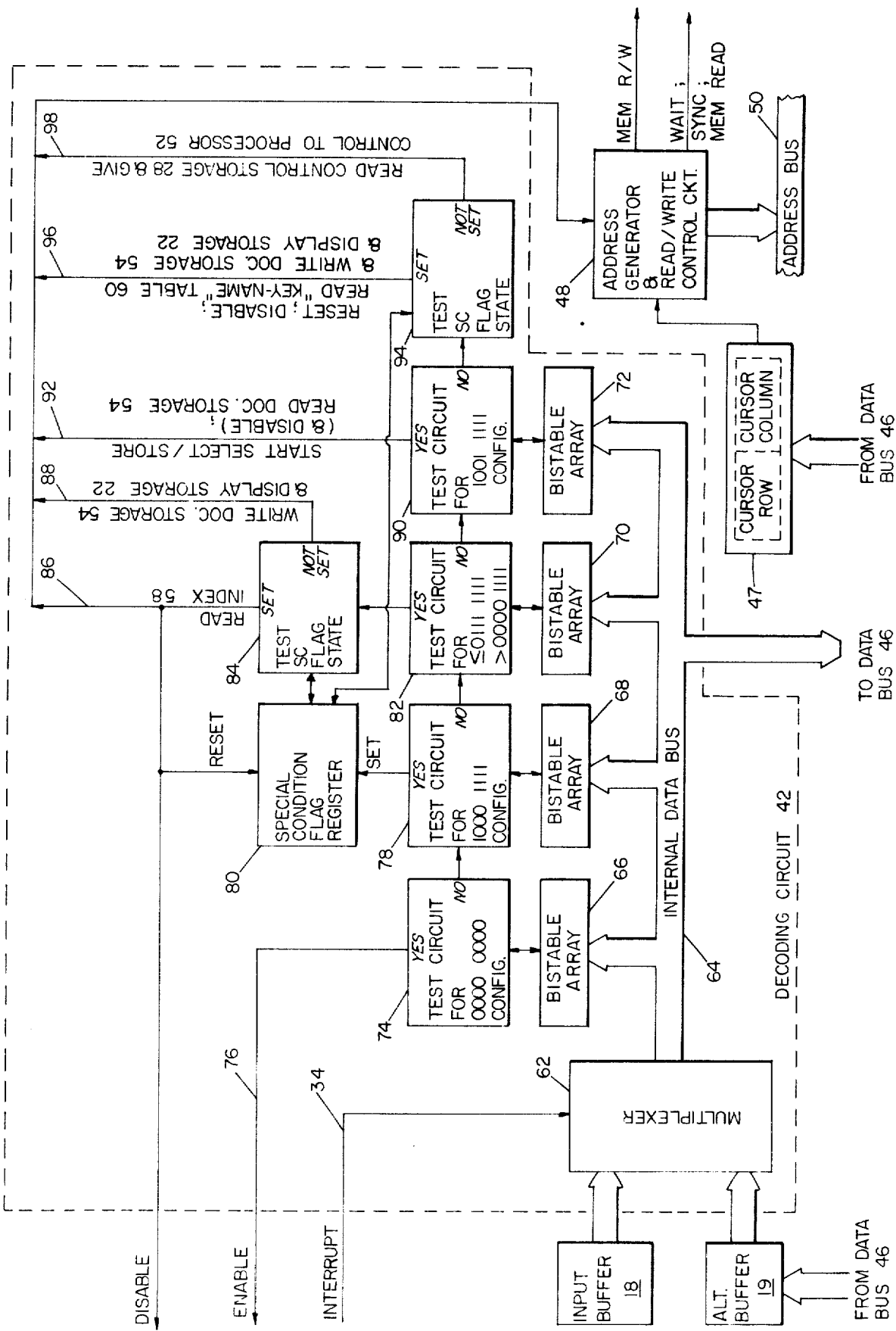
FIG. 7 is a more detailed showing of the decoding circuit of FIG. 6.

Referring now to FIG. 7, decoding circuit 42 is shown in more detail. Essentially, this circuit comprises an internal bus for applying the internal representation of an input signal to set the states of a sequence of arrays, each comprising a sequence of bistable elements, and a sequence of test circuits for testing the configuration of each array after the elements have been set. Control signals are derived as the result of the tests.

More in detail, the contents of input buffer 18 are applied to a multiplexer 62, which is switched by the interrupt signal 34. The contents of buffer 18 are multiplexed with the contents of an alternate buffer 19, which is employed during the process of recalling stored selected signals, as will be explained in what follows. The multiplexer gates the input signals onto an eight-bit internal data bus 64, which applies the signals to each of four arrays, each comprising eight two-state elements. Each element of an array is set to one of the two states in accordance with the input signals, and the resulting configuration is tested by a test circuit.

First, the configuration of array 66 is tested by circuit 74, which tests for the configuration in which all the elements of the array are in the "0" state. The purpose of this test, which is related to the recall of stored sequences, will become apparent in what follows. If the test is positive, an "enable" control signal 76 is output to interrupt circuit 32 (FIG. 6), to enable the input of further signals from keyboard 12. If the result of this test is negative, the next test circuit 78 is enabled.

Next, circuit 78 tests the configuration of the elements in array 68 for the configuration "1000 1111" (hexidecimal value "8F"). By reference to FIG. 15 it is seen that this is the internal representation of the "S.C." (for "special condition") key on keyboard 12. If the result of this test is positive, a SET signal is output to special condition flag register 80, to set the special condition flag. The special condition flag is employed in connection with the input of key-specific signals corresponding to text-modifying operations intended for later recall, and in connection with the recall of stored sequences, as will become apparent in what follows.

If circuit 78 does not find the configuration "1000 1111" in array 68, the next test circuit 82 is enabled. This circuit tests the configuration in array 70 to determine whether it is numerically less than or equal to 0111 1111 and greater than 0000 1111. By reference to FIG. 16 it is seen that if the result of this test is positive, the input signals correspond to a text character (which may be a digit), while if the result is negative, the input signals correspond to a text-modifying operation key. If the result is positive, a signal is output to enable circuit 84 to test the state of the flag in special condition flag register 80.

If the flag in register 80 is found to be set (having been set in response to a previously decoded special condition input signal), the input character is to be regarded as an "index character", which is employed in the recall of a previously stored sequence, as will be explained in what follows. An internal control signal 86 is generated to control the address and read/write control means to read the index of special condition storage 58 in RAM 26 at a location corresponding to the index character. (The relation of the index character to the index and to the stored sequence will be explained in what follows.) If the flag is not found to be set, the input character is simply a character in the current document; the internal control signal 88 is generated to control the address and read-write control means to write the input character into document storage 54 of RAM 26 and into display storage 22.

If the result of the test performed by circuit 82 is negative, the input signal does not correspond to a text character. A signal is output to enable the next test circuit 90, which tests the content of array 72 for the configuration 1001 1111 representing a "select/store" command.

If the result of the test performed by circuit 90 is positive, a "select/store" command has been input by the system user by actuation of select/store key 172 on keyboard 12; an internal control signal 92 is output, to control the address control means and read/write control means to read document storage 54 in RAM 26 at a location corresponding to the current document number, in order to select and store a sequence, as will be explained in more detail. This control signal, in addition, disables interrupt circuit 32, and is input to select/store circuit 44. If the result of the test is negative, a text-modifying operation key has been actuated by the system user. A signal is output to enable the final test circuit 94, which tests the state of the flag in special condition flag register 80.

If the flag is found to be set, the "special condition" key 170 has been previously actuated by the system user; the internal control signal 96 is output to reset the flag, read the "key-name" table in block 60, and write the addressed "key-name" into document storage 54 and display storage 22. The purpose of reading and writing the "key-name" will be explained.

If the flag is found not to be set, the text-modifying operation corresponding to the key actuated by the system user is intended to be carried out upon the text of the present document. An internal control signal 98 is output to control the address control means and read/write means to read control storage 28, and to give control to processor 52. The appropriate instructions will be accessed, and processor 52 will operate in accordance therewith to carry out the text-modifying operation specified by the input signal.

The various internal control signals output by the test circuits are input to address generator and read/write control circuit 48. In addition, the current row and column positions of the "cursor" graphic (position indicator) on display 14 are stored in block 47, and signals representative of these positions are input to the address generator. The cursor position may be changed directly by the user by actuation of the cursor move keys 162, 164, 166 and 168 (FIG. 3); the cursor position is also updated by the system control means, in a manner not relevant to the present invention, upon actuation of any other key affecting the display. For example, upon the entry of a text character, the cursor is moved to the next display position; upon actuation of the return key, the cursor is moved to the first column in the next row of the display.

Figure 9:
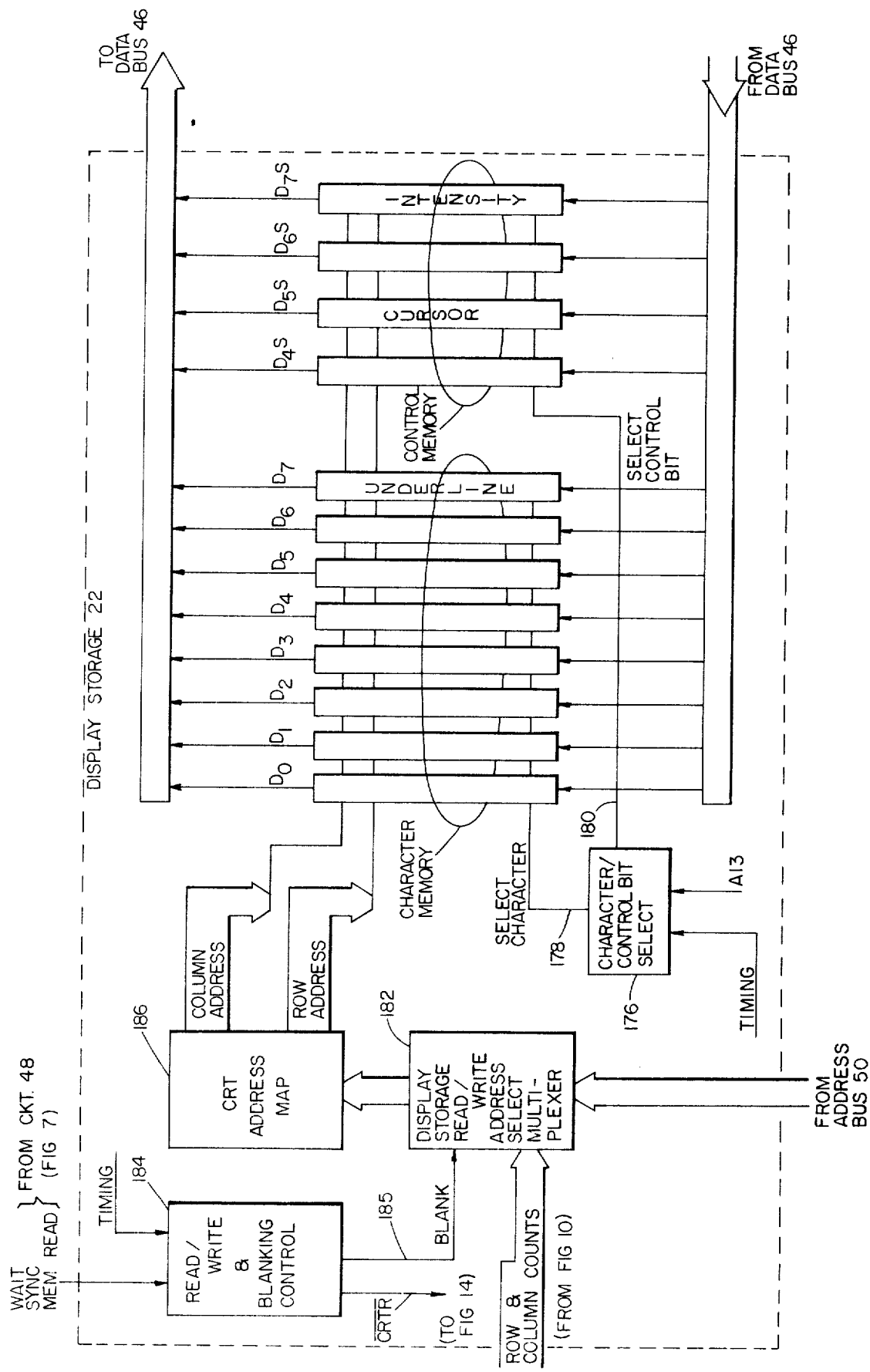
FIG. 9 shows the display storage of FIG. 2 in greater detail.

The address generator, in a manner well known in the art, with reference to the current cursor row and column positions generates appropriate address signals and applies them to address bus 50 to address RAM 26, control storage 28, display storage 22, or "key-name" table 60. Address bits A12–A14 are applied to chip select decode circuit 102 (FIG. 6), which derives therefrom chip enable signals which are applied in a known manner to RAM 26 and "key-name" table 60 to select particular portions thereof. Circuit 48 further outputs appropriate read/write control signals including "MEM R/W", which is applied (together with timing signals, not shown) to read/write strobe circuit 100 (FIG. 6) to generate strobe signals, which control read/write operations on RAM 26, control storage 28, and block 60. Control signals "WAIT", "SYNC" and "MEM READ" are applied to display storage 22 (FIG. 9).

Figure 8:
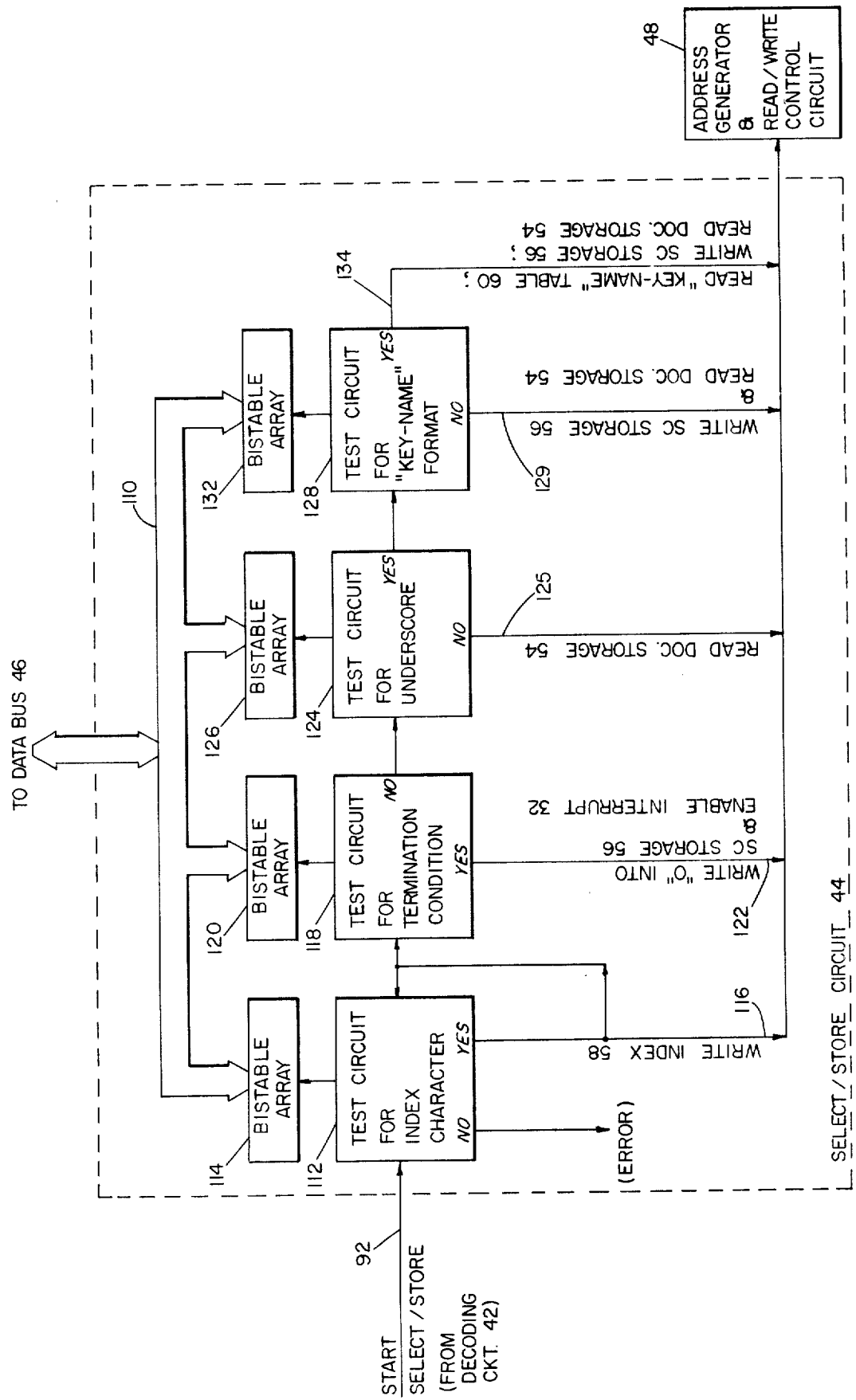
FIG. 8 is a more detailed showing of the select/store circuit of FIG. 6.

Referring now particularly to FIG. 8, select/store circuit 44 essentially comprises an internal data bus 110 connected to system data bus 46, for applying the internal representation of a key-specific signal to set the states of a sequence of arrays of bistable elements, and a sequence of test circuits for testing the configuration of each array after the elements have been set. (In certain cases, for simplicity, a single array is shown, although in practice two or more arrays must be successively set and tested to perform the test indicated.) Internal control signals are derived as the result of the tests. During a select/store operation, the representations being applied to circuit 44 are not applied to the display.

A start select/store signal 92 from test circuit 90 in decoding circuit 42 enables the first test circuit 112, which tests the configuration of elements in array 114. This circuit tests only the first internal representation to be applied to select/store circuit 44, which must be in a form to be recognized as an "index character". In the present embodiment, the recognizable form has been defined as a single text character, enclosed between parentheses, in the first three positions in the document (that is, nothing appears before them, even a space). Therefore the first three characters must be tested by circuit 112 to determine whether an index character is present. If the first three characters do not conform to the required form, an error signal is output. (Error signals result in an alarm and/or a displayed prompt to the user; the specific error signal forms no part of the present invention.) If the first three characters do conform to the requirement, circuit 112 outputs an internal control signal 116 which controls the address control means and read/write control means to write the enclosed index character into the index of special condition storage 58 in RAM 26, together with the address of the portion of special condition storage 56 at which the subsequently selected string of text will be stored.

Control signal 116 is applied to circuit 112 to disable this circuit, and is applied to the next test circuit 118 to enable it. Circuit 118 tests the configuration of the elements in array 120, set by the next succeeding internal representation from document storage, for a configuration corresponding to a "termination condition". In the present embodiment, this is generated by successively actuating the cancel and execute keys; however, it may be generated by other suitably chosen keys.

If a termination condition is detected, circuit 118 outputs internal control signal 122, which controls the address control and read/write control means to write the (hexadecimal) character "00" into the special condition storage 56, and to enable interrupt circuit 32. If the termination condition is not detected, a signal is applied to enable the next test circuit 124, which tests the condition of the eighth bit of the array 126. If the eighth bit is "on", representing an underscored character, a signal is output to enable the final test circuit 128. However, if the eighth bit is "off", an internal control signal 125 is output to control the address and read/write storage means to read the next stored internal representation out of document storage 54 in RAM 26. Thus, in effect, a character which is not underscored is bypassed by the circuit.

The final test circuit 128 tests the configuration of array 132 for the "key-name" format. This circuit consists of a sequence of two test circuits, not shown in detail, to detect the presence of a left parenthesis and a hyphen, retrieved in sequence from document storage 54. If both are found, the succeeding stored internal representations (comprising the "key-name") are read out of document storage 54, and internal control signal 134 is output, to control address and read/write control means to apply the "key-name" to address the contents of block 60 (FIG. 6), to read out of block 60 the single internal representation of the corresponding operation, and to store it into special condition storage 56.

CONTROL OF DISPLAY

Referring now particularly to FIGS. 9 through 14, the control of display 14 to display the contents of display storage 22 will be described, for the sake of complete understanding of the operation of the invention. However, the control of the display is accomplished in a manner that is in general known, and the details form no part of the present invention.

In brief summary, as has been described, the display on screen 14 is divided into a matrix of row and column positions. Each position may be occupied by a display graphic or may be blank. There are 24 rows (vertical positions) and 80 columns (horizontal positions); thus, there are a total of 1920 positions on the screen. The matrix of display positions is mapped into the character memory of display storage 22 (FIG. 9).

Each possible display graphic is composed of a pattern of dots in an eight by eight dot matrix. A binary representation corresponding to a particular display graphic (or the absence of a graphic) is stored at each position in the character memory corresponding to a display position on screen 14. To generate the display, this representation is read out and applied to address a "character generator", which contains the information for generating the eight by eight dot matrix of each display graphic. The dot patterns are read out from the character generator and are used to control the illumination of CRT display 14 in a known manner.

It will be appreciated that the content of the character memory of display storage 22 is necessarily constantly changing as new text is input, or as text-modifying operations are carried out, or as previously stored material is recalled from document storage 54 in RAM 26 for further editing. Consequently, the pattern of display 14 is likewise constantly changing.

Referring now to FIG. 9, information as to which graphic symbol is to be displayed in each of the symbol positions of the screen is stored in the character memory of the display storage 22, which is a random access memory. The information needed to control the display of a character comprises twelve bits in all. Of these, eight bits (D0–D7) comprise the internal representation of the character code, and four bits are control bits. Two control bits control the intensity (high or low) of the character and presence or absence of the cursor. The others have functions not relevant to the present invention. Since the data bus is only 8 bits wide, the control bits must be addressed separately. Therefore the character codes are stored in 8K of storage having addresses 56K through 64K, called the "character memory", and the related control codes are stored in 8K of storage having addresses 48K to 56K, called the "control memory".

The CRT character memory (in display storage 22) is organized as "partially loaded addresses". That is, the portion of the sixteen bit address (the three high order bits) that specifies character memory rather than control memory is preassigned. The high address byte is used as a CRT row value (1 to 32); the low byte is used as a column value (1 to 80). As 8K is allocated for the CRT memory, this will allow a maximum of 32 rows, each row containing 256 characters. However, only 24 rows are used, with 80 columns in each. The address has the form:

| high byte | low byte |
|---|---|
| 111X XXXX | YYYY YYYY | where XXXXX=row address, 0 through 23, and YYYY YYYY=column address, 0 through 79. Bits A13, A14 and A15 are all "1".

The control memory is also organized as "partially loaded addresses". The high address byte points to the control bits of the CRT rows while the low address byte points to the control bits of the CRT columns. The address has the form:

| high byte | low byte |
|---|---|
| 110X XXXX | YYYY YYYY | where
X XXXX=row address 0 through 23, YYYY YYYY=column address 0 through 79. Bits A14 and A15 are "1"; bit A13 is "0".

The value of address bit A13 therefore determines whether a character bit or control bit is addressed.

The WAIT, SYNC and MEM READ signals from Address Generator and Read/Write Control circuit 48 (FIG. 7) are input with a timing signal to Read/Write and Blanking Control circuit 184. A Display Storage Read/Write Address Select Multiplexer 182 is under the control of Read/Write & Blanking Control circuit 184, which permits data to be written into display storage (or read out of display storage to the system control means) at addresses output from system control means 20 on address bus 50, only during the vertical retrace (or vertical blanking interval) of the CRT beam. During the raster scan interval, display storage 22 is addressed by the row and column counts (from FIG. 10) to read out the information stored in the memory at the appropriate times to generate the symbol display on CRT 14.

As controlled by the blanking signal 185 from circuit 184, the address on address bus 50, or the row and column count from FIG. 10, is input by multiplexer 182 to CRT address map 186, which generates column and row addresses. In addition, bit A13 of the address on bus 50 is input to Character/Control Bit Select circuit 176 (together with a timing signal). If A13=1, the eight character bits are addressed; if A13=0, the four control bits are addressed.

Figure 14:
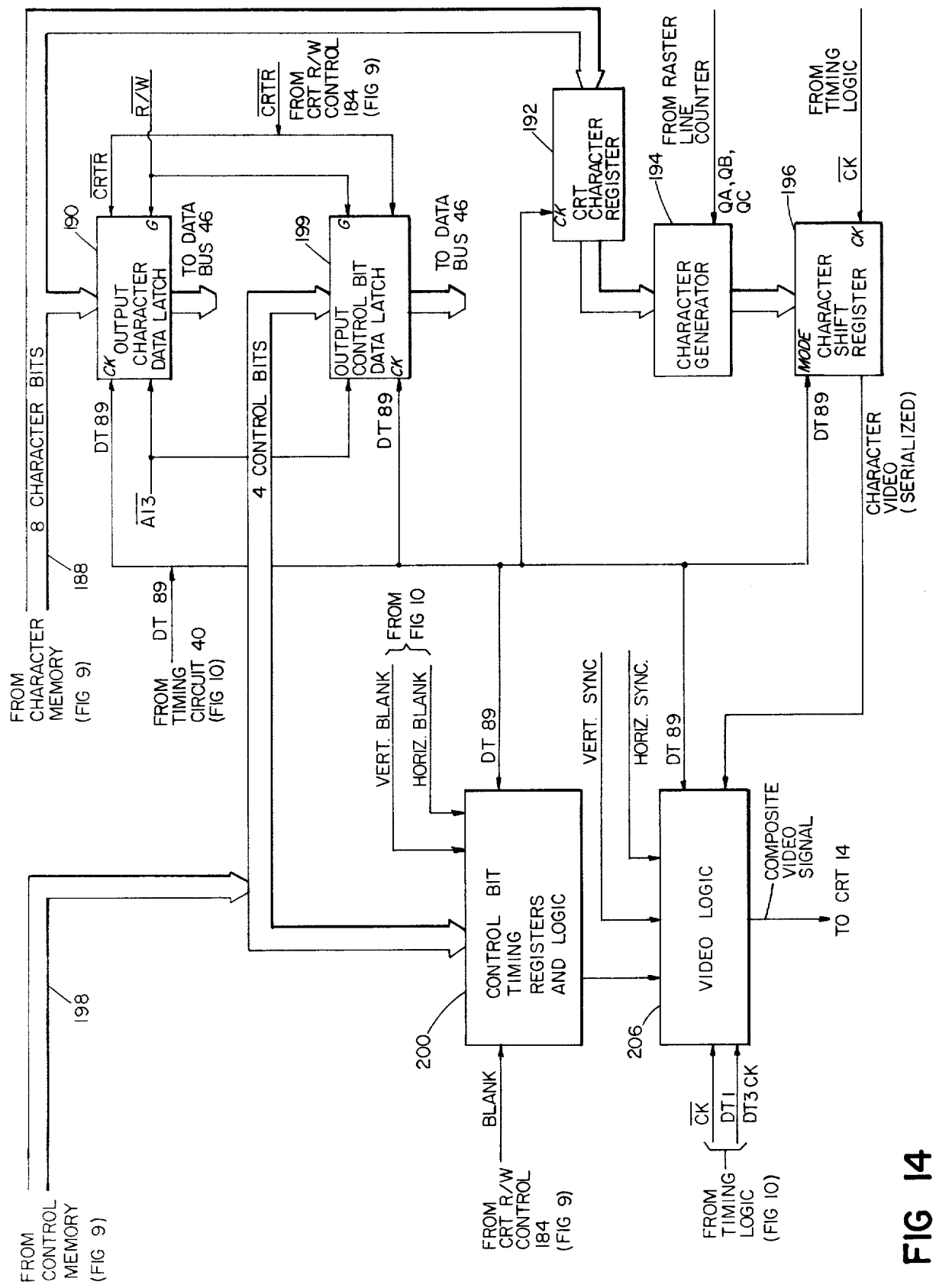
FIG. 14 is a more detailed diagrammatic showing of the display control means of FIG, 2.

Referring now to FIG. 14, if the Character Memory is addressed, the eight character bits are read out to an internal data bus 188, from which they are input to Output Character Data Latch 190 and CRT Character Register 192. From Data Latch 190 the character bits are applied to data bus 46. From Character Register 192 the character bits are applied to Character Generator 194, which stores the information corresponding to the sixty-four bits (eight by eight) required to generate each one of the character symbols on the CRT screen. The information is stored in eight-bit words, divided into thirty-two groups of eight words per group. The eight character bits address one of the character symbol groups. The eight words within each group are individually addressed by three additional bits derived from the video timing logic, which bits identify which of the eight lines of a symbol is currently being scanned across the monitor display screen. The eight-bit words stored in character generator 194, as they are addressed, are transferred out in parallel to the video shift register 196. The eight bits are then shifted out of the video register 196 serially to video logic block 206, to modulate the cathode ray beam to form the desired pattern of eight dots of one line of the selected symbol.

If the Control Memory is addressed, the control bits (cursor and intensity) are output from display storage 22 via an internal bus 198 to Output Control Bit Data Latch 199 and to Control Bit Timing Registers and Logic block 200, where they are combined with the vertical and horizontal blanking signals (from FIG. 10) and BLANK signal 185 from control block 184 (FIG. 9) and are input to the video logic circuit 206. The serialized character video from shift register 196 is also input to circuit 206, which derives a composite video signal to control the beam of the CRT in a known manner.

The set of internal representations of all graphic symbols (FIG. 18) is such that the necessary information to specify the symbol is carried in seven bits. The eighth bit of each internal representation is therefore available to carry the information "underscored" or "not underscored" as to that character. The state of the eighth bit is employed by the display control logic 24 (by addressing character generator 194) to vary the display of the graphic symbols. This is interpreted, according to the invention, to provide a mode of display of symbols intended for later recall that is visually distinct from the mode of display of symbols not intended for later recall. As has been described, according to the invention, select/store circuit 44 responds to the state of the eighth bit to cause either the selection and storage of signals representing characters and operations intended to be stored for later recall, or the bypassing of signals representing characters and operations not intended to be stored for later recall.

Therefore, the information according to which a representation is to be selected or stored is carried as the eighth bit of the character representation, rather than as additional bits associated with the character representation. (The control bits are not relevant to the select/store operation.) Since the data buses, storage registers, buffers, and other elements of the modified system have been previously designed to handle representations of a characteristic size, namely eight bits, this means of carrying and responding to the mode information is advantageous. If it were necessary to add one or more additional binary digits to the character representation to code the select/store information, the representation could not be transmitted through the system during a select/store operation without either providing an additional channel for the additional information, or performing an additional operation to transmit the additional bit over the existing channels.

OPERATION

In operation, the user of the text-editing system of the invention can enter and edit text (by means of the text-modifying operations) in the conventional manner, or can use the keys to enter text and text-modifying operational instructions in the special input mode, for later (or repetitive) retrieval and execution. These two modes of operation will be described, with reference to the Figures.

First, in conventional editing operation of the system, the user actuates keys on keyboard 12 to input a sequence of text characters, and to modify the sequence by means of the operational keys. If the user wishes, for example, to insert into the text he is currently editing the word "Massachusetts", he actuates the (-INSERT-) key 161 on keyboard 12. Signal input means 16, coupled to key 161, generates an external representation 0110 0010 of this key, which is applied to block 30 (FIG. 6) in order to read out the corresponding internal representation 1000 0011 into input buffer 18. An interrupt signal 34 gates this representation onto the internal data bus 64 of decoding circuit 42, where it sets the elements of bistable array 66.

Test circuit 74 does not detect an all zero condition of array 66; test circuit 78 is enabled, and does not detect the 1000 1111 configuration in the state of array 68. Therefore special condition flag 80 is not set, and test circuit 82 is enabled. This circuit does not detect a configuration of array 70 corresponding to a character, and therefore test circuit 90 is enabled. The select/store command is not found; therefore test circuit 94 is enabled, the special condition flag is tested and found not to be set, with the result that an internal control signal is generated which is applied to address generator and read/write control circuit 48 to cause addressing of control storage 28. Appropriate instructions are accessed; processor 52 operates according to such instructions to split the test displayed on screen 14 at the point indicated by the cursor when the (-INSERT-) key is actuated, and to await entry by the user of the material to be inserted.

The user next actuates character keys successively to enter internal representations of the characters Massachusetts into buffer 18. Each character is applied to decoding circuit 42, and for each character, test circuit 82 outputs an internal control signal 88, which is applied to address generator and read/write control circuit 48 to cause the internal representation of the character to be written into document storage 54 in RAM 26. The internal representation is also written into display storage 22, and is read out and applied to address character generator and thereby to be displayed on screen 14.

When the entire matter to be inserted has been entered, the user actuates the (-EXECUTE-) key, which is decoded in circuit 42 to derive internal control signal 98, giving control to processor 52, which operates according to stored instructions to move the text following the inserted matter into its proper position in document storage 54 and display storage 22.

If the word "Massachusetts" is required to be inserted in a number of places in a document that has previously been input to the system and is stored in document storage 54, the system user may wish to store the sequence of operations necessary to accomplish the insertion, and repetitively to access the stored sequence at the required locations in the document. This is accomplished, according to the invention, in the following way.

The user proceeds as though to input a new document into the system. The system assigns a document number to this document, as has been described, and stores the input characters in document storage 54 and display storage 22 in the usual manner. The document is displayed on screen 14 as it is input.

Index Character

The user must first assign an "index character" to the sequence to be stored. This index character will be employed to recall the sequence. As has been described, the index character must be input in a prescribed form in order to be recognized as such. Specifically, in the present embodiment, the user must enclose the index character in parentheses and these characters must appear in the first three positions in the document. For example, the user may assign the character "a" to the sequence to be entered. Therefore, the user actuates keys to input (a)

into the system. These three characters are successively decoded in decoding circuit 42, which generates internal control signals which cause the internal representations of the characters to be stored in document storage 54 and display storage 22.

Text-Modifying Operations

The user next must input the text-modifying operation "insert" for storage. Since the insert operation is not to be carried out when entered, but rather at a later time on recall, the special condition key 170 is first actuated. The internal representation 1000 1111 of this key is applied to decoding circuit 42, where it sets the elements of the bistable arrays. Test circuit 78 detects the presence of this configuration, and outputs a signal to set the flag in special condition flag register 80.

The user next actuates the "insert" key 161. The internal representation of this key is applied to decoding circuit 42, where it sets the elements of the bistable arrays. Test circuit 82 does not detect a configuration corresponding to a text character; test circuit 90 does not detect a configuration corresponding to the select/store command; test circuit 94 is therefore enabled, and tests the state of the flag in register 80. This flag is found to be set. In response, an internal control signal is derived which resets the flag in register 80 and causes the internal representation of the "insert" key to be applied to address "key-name" table in block 60. The modified "key-name" representation (-INSERT-) is read out of block 60, and the ten internal representations of the ten characters comprising the key-name are written into document storage 54 and display storage 22. The display now shows (a) (-INSERT-)

Note that the instructions in control storage 28 for performing the insert operation are not accessed.

Text Characters

The user next actuates the keys of keyboard 12 to input the word "Massachusetts". Each letter is decoded in circuit 42 and stored in document storage and display storage. The display now shows (a) (-INSERT-)Massachusetts The user must actuate the "execute" key 159 in order to complete the operation. Actuation of this key must be preceded by actuation of the special condition key. Decoding circuit 42 sets the special condition flag in response to the special condition key, and detects its set condition when the internal representation of the "execute" key is decoded. In response, the "key-name" table in block 60 is addressed, and the key-name (-EXECUTE-) is written into document storage and display storage.

For the select/store circuit 44 to derive appropriate control signals to store the input signals for later recall, the characters must be underscored. The system user therefore underscores the input:

(a) (-INSERT-)Massachusetts(-EXECUTE-)

Comments

For the better understanding of other users, the user wishes to add a comment, not to be inserted into the text at a later time, that Massachusetts is a domicile. The word (domicile) is therefore entered into the system, but without underscoring:

(a) (-INSERT)Massachusetts(-EXECUTE-) (domicile)

If the system user wishes to edit the input sequence, he actuates the text-modifying operational keys without first actuating the special input condition key. For example, the above display might be clearer if the index character were separated from the editing sequence intended for later recall. The user can (using the insert key as previously described, and the return key) insert a return into the displayed text, to achieve the following display:

(a)

(-INSERT-)Massachusetts(-EXECUTE-) (domicile)

The insert and return keys have been actuated to edit the pesent document, but will not affect the document which will be edited at a later time by recalling this sequence. This return is referred to as a "cosmetic" operation.

Termination Condition

The system user must indicate that this is the end of the sequence to be stored for later recall. This is done by successively actuating the (-CANCEL-), (-EXECUTE-) keys on keyboard 12.

Select/Store

The sequence of internal representations for this sequence of text and operations has been written into document storage 54. However, it is not yet accessible for recall. The user must actuate the select/store key 172 on keyboard 12.

The internal representation of the select/store key (1001 1111) is applied to decoding circuit 42. Test circuit 90 detects this configuration of the elements of array 72, and outputs the internal control signal 92, which causes the system control means to read the currently accessed document in document storage 54. The representations comprising the document are read out and sequentially applied to select/store circuit 44. The first test circuit 112, enabled by the start select/store signal 92, tests the first three characters of the document for the required form for an index character. The first three characters are (a), which is in the required form. Therefore, the internal control signal 116 is derived, which controls the system to write the index character "a" into the index 58 of special condition storage in RAM 26, together with the address in special condition storage at which the sequence is to be stored.

The next internal representation retrieved from document storage 54 is 0000 0011, the representation of the return key, providing the "cosmetic" return. As is seen from FIG. 18, this representation is interpreted by display control 24 to generate a return graphic symbol on display 14. However, as has been discussed, this symbol cannot be underscored. Therefore test circuit 124 detects the "off" condition of the eighth bit of array 126 set by the representation, and outputs control signal 130 to control the retrievel of the next representation stored in document storage 54.

The next characters to be read out of document storage 54 are found by test circuit 124 to be underscored, and by test circuit 128 to be in the "key-name" format. Internal control signal 134 is output, controlling the system to read the "key-name" table 60 at the location addressed by the "key-name" (-INSERT-), and to read out the internal representation of the "insert" key (1000 0011). This representation is written into special condition storage 56 at the location corresponding to the index character "a".

The next characters read out of document storage 54, comprising the word Massachusetts, are each found to be underscored, and each is therefore tested for the key-name format. As each character is found not to be part of a key-name, an internal control signal is output causing the system to write the internal representations of the character (without the underscore) into special condition storage 56, following the representation of the "insert" key.

The key-name format of the (-EXECUTE-) sequence is detected by test circuit 128, which outputs a control signal causing the internal representation of the "execute" key to be written into special condition storage 56.

The next character is a left parenthesis. This is applied to set the elements of array 126, and test circuit 124 finds that the eighth bit of the array is "0". As a result, internal control signal 130 is output, causing the system to read the next character from document storage, while nothing is written into special condition storage. The remaining characters of the comment (domicile) are bypassed in this manner.

Finally, the termination condition is read out of document storage and is applied to select/store circuit 44. Test circuit 118 detects the configuration corresponding to this condition, and derives the internal control signal 122, which causes the system to write "0" into the special condition storage, and to enable interrupt circuit 32 (FIG. 6). The system is now able to accept further inputs from the keyboard.

The input sequence now exists in two different forms, stored in different places. First, the representations of the original input sequence, including key-names, comments, and cosmetic operations, continue to be stored in document storage 54. This document can be accessed in the conventional way for display, and can be edited like any other document. It can also be printed. Second, the selected sequence is stored in special condition storage. It cannot be displayed or printed; however, it can be recalled by actuation of the special condition key and the appropriate index character key, whereupon the system control means will respond to the stored selected sequence to store and display text from the selected sequence as part of the current document, or to modify the current document, as though the selected sequence had just been entered through the keyboard. The alterations become part of the document being edited. The stored selected sequence can be recalled again at any time for repetitive use.

Recall

Before recalling the stored sequence, the user must first access the document to be edited. Note that the document to be edited is not the same as the document created when the above sequence of characters and operations was input. The document to be edited is accessed by inputting the document number previously assigned by the system, as has been described. The document is addressed in document storage 54, and is displayed (one screen load at a time) on screen 14.

The user moves the cursor by means of keys 162, 164, 166, and 168 to the first location where the insertion is to be made. The user then actuates special condition key 170. The internal representation 1000 1111 of this key is applied to decoding circuit 42, and is detected by test circuit 78. In response, the special condition flag in register 80 is set.

The user then actuates the appropriate key to input the character "a". The internal representation of this character is applied to decoding circuit 42, and is detected by test circuit 82. The test flag circuit 84 is enabled, and detects the set condition of the special condition flag. In response, internal control signal 86 is output, resetting the special condition flag, and causing the system control means to read index 58 in RAM 26 at the location corresponding to the character "a". The address in special condition storage that is specified by the index is then applied to address special condition storage 56, and the interrupt circuit 32 is disabled. No inputs can be accepted from the keyboard until the stored sequence has been completely executed.

The representations of the stored sequence are read out from storage 56 onto data bus 64, and are applied sequentially to alternate buffer 19 (FIG. 7). Since the interrupt signal 34 is disabled, multiplexer 62 gates the stored sequence, one character at a time, onto internal data bus 64, where it is decoded, precisely as though the characters and text-modifying operations had been entered through the keyboard. The (-INSERT-) operation is carried out by processor 52; the word Massachusetts is inserted. The (-EXECUTE-) internal representation is decoded to control the processor 52 to complete the operation of "insert." Finally, the "0" representation is read out of special condition storage to decoding circuit 42, and is detected by test circuit 74. In response, internal control signal 76 is output, enabling interrupt circuit 32. The system will now accept subsequent input through the keyboard.

The system user can repetitively access the stored sequence of characters and operations by actuating the special condition key, followed by the key for the index character. The sequence will be executed at the location specified by the current position of the cursor.

Chained Recall of Sequences

It should be noted that it is possible to enter the key-specific signals for the special condition key and a secondary index character, corresponding to a secondary, previously stored, sequence, through the keyboard as the last elements of a primary sequence that will be selected and stored in response to the select/store key. In this case, the representations precede the "termination condition" input. Thereafter, when the primary sequence is recalled and its stored representations are applied to decoder 42, the internal representations of the special condition key and the secondary index character will be decoded. The "0" representing the termination condition of the primary stored sequence is not reached or decoded; hence the keyboard interrupt is not enabled. The secondary stored sequence will immediately be addressed and retrieved as though it had been recalled from the keyboard. This permits chained recall of stored sequences, greatly increasing the flexibility of operation provided by the invention.

What is claimed is:

1. A text-editing system having
    a keyboard providing a plurality of manually actuated alpha-numeric character keys, and a plurality of manually actuated text-modifying operation keys,
    signal input means coupled to said character and operation keys for inputting to said system an interrupt signal and a key-specific signal in response to actuation of any one of said character and operation keys,
    input buffer storage connected to said signal input means for holding an input said key-specific signal,
    writable text storage,
    display means for display of visual representations of characters corresponding to said alpha-numeric character keys,
    display control means connected to said display means and having writable display storage,
    a control storage storing groups of microinstructions,
    system control means connected to said input buffer storage, said text storage, said display control means and said control storage, and responsive to said interrupt signal for fetching from said input buffer storage and decoding a said input signal and deriving therefrom internal control signals,
    said system control means being responsive to a said key-specific signal corresponding to actuation of a said text-modifying operation key to derive internal control signals for addressing said control storage to access particular said microinstructions corresponding to said operation, for operating according thereto to carry out the operation specified by said text-modifying operation key, and for modifying said text storage and said display storage in accordance with such operation,
    said keyboard further providing a special input condition key, said signal input means being responsive thereto to provide an interrupt signal to said system control means and a special input condition signal to said input buffer storage,
    said system further comprising read-only special condition representation storage containing a set of text-modifying operation key-specific signals and a set of corresponding displayable special condition representations, said system control means being connected to said special condition representation storage for addressing and retrieving elements of said sets, and
    said system control means further comprising a special condition flag register for storing a special condition flag,
    said system control means being responsive to a said special input condition signal to set said special condition flag to a first value,
    said system control means being responsive to an input signal corresponding to actuation of one of said text-modifying operation keys and to the set condition of said special condition flag to derive internal control signals for addressing said stored set of displayable special condition representations to access a special condition representation corresponding to said input signal, and for storing said special condition representation into said text storage and into said display storage for display, and for resetting said flag.

2. The system of claim 1 wherein
    said keyboard further provides a select/store key, said signal input means being coupled thereto for inputting an interrupt signal and a select/store signal to said system,
    said system further comprising writable special condition storage connected to said system control means,
    said system control means being responsive to said select/store signal to derive internal contol signals for addressing said text storage and retrieving said special condition representations therefrom, and responsive to a said retrieved special condition representation to derive internal control signals for addressing said read-only special condition representation storage, retrieving a corresponding text-modifying operation key-specific signal therefrom, and storing said retrieved signal in said writable special condition storage.

3. The text-editing system of claim 1, wherein
    said system control means comprises
    a decoder responsive to said interrupt signal for fetching from said input buffer storage and decoding a said input signal and deriving therefrom said internal control signals, and a processor connected to said control storage for operating according to said accessed groups of microinstructions to carry out operations specified by actuation of said text-modifying operation keys.

4. The system of claim 3 wherein said keyboard further provides a select/store key, said signal input means being coupled thereto for inputting an interrupt signal and a select/store signal to said system, said system further comprising writable special condition storage connected to said system control means, said system control means further comprising a selector/storer, said decoder being responsive to said select/store signal to derive internal control signals for addressing said text storage and retrieving special condition representations therefrom for input to said selector/storer, and said selector/storer being responsive to a said retrieved special condition representation to derive internal control signals for addressing said read-only special condition representation storage, retrieving a corresponding text-modifying operation key-specific signal therefrom, and storing said retrieved signal in said writable special condition storage.

5. In a text-editing system having a keyboard providing a plurality of manually actuated alpha-numeric character keys, and a plurality of manually actuated test-modifying operation keys, signal input means coupled to said character and operation keys for inputting to said system an interrupt signal and a key-specific signal in response to actuation of any one of said character and operation keys, input buffer storage connected to said signal input means for holding an input said key-specific signal, writable text storage, display means for display of visual representations of characters corresponding to said alpha-numeric character keys, display control means connected to said display means and having writable display storage, a control storage storing groups of microinstructions, system control means connected to said input buffer storage, said text storage, said display storage, and said control storage, and responsive to said interrupt signal for fetching from said input buffer storage and decoding a said input signal and deriving therefrom internal control signals, said system control means being responsive to a said key-specific signal corresponding to actuation of a said text-modifying operation key to derive internal control signals for addressing said control storage to access particular said microinstructions corresponding to said operation, for operating according thereto to carry out the operation specified by said text-modifying operation key, and for modifying said text storage and said display storage in accordance with said operation, that improvement wherein said keyboard further provides a special input condition key, said signal input means being responsive thereto to provide an interrupt signal for said system control means and a special input condition signal to said input buffer storage, and said system further comprises read-only special condition representation storage containing a set of text-modifying operation key-specific signals and a set of corresponding displayable special condition representations, said system control means being connected to said special condition representation storage for addressing elements of said sets, and a special condition flag register for storing a special condition flag, said system control means being responsive to a said special input condition signal to set said special condition flag, said system control means being responsive to an input signal corresponding to actuation of one of said text-modifying operation keys and to the set condition of said special condition flag to derive internal control signals for addressing said stored set of displayable special condition representations to access a special condition representation corresponding to said input signal, and for storing said special condition representation into said text storage and said display storage.

6. In a text-editing system having a keyboard providing a plurality of manually actuated alpha-numeric character keys, and a plurality of manually actuated text-modifying operation keys including an underscore key signal input means coupled to said character and operation keys for inputting to said system an interrupt signal and a key-specific signal in response to actuation of any one of said character and operation keys, input buffer storage connected to said signal input means for holding an input said key-specific signal, writable text storage, display means for display of visual representations of characters corresponding to said alpha-numeric character keys, display control means connected to said display means and having writable display storage, a control storage storing groups of microinstructions, system control means connected to said input buffer storage, said text storage, said display storage and said control storage, and responsive to said interrupt signal for fetching from said input buffer storage and decoding a said input signal and deriving therefrom internal control signals, said system control means providing current position storage and being responsive to said input signals for updating the content of said current position storage, said system control means being responsive to a character key-specific input signal and to the content of said current position storage to derive internal control signals for addressing said text storage and said display storage at a current position address and writing a corresponding character representation therein, said system control means being responsive to a said key-specific signal corresponding to actuation of said underscore key and to the content of said current position storage to derive internal control signals for addressing said text storage and said display storage at a current position address and for modifying the said character representation stored at such address, said display control means being responsive to said modified character representation for displaying said character in underscored format, that improvement wherein
said keyboard further provides a select/store key, said signal input means being coupled thereto for inputting an interrupt signal and a select/store signal to said system, said system further comprising writable special condition storage connected to said system control means, said system control means being responsive to said select/store signal to derive internal control signals for addressing said text storage and retrieving stored character representations therefrom, said system control means being responsive to a said retrieved modified character representation to derive internal control signals for storing said character representation in said special condition storage, and reponsive to a said retrieved unmodified retrieved character representation for not storing said character representation.

7. The improvement of claim 6, wherein said system further comprises
a writable index of said special condition storage,
a special input condition key on said keyboard, said signal input means being responsive thereto to provide an interrupt signal to said system control means and a special input condition signal to said input buffer storage, and
a special condition flag register for storing a special condition flag, said system control means being responsive to a said special input condition signal to set said special condition flag,
said system control means being responsive to particular character key-specific signals defining an index character, retrieved from said writable text storage responsive to said select/store key, to derive internal control signals for controlling the storing of said index character into said index in association with an indexed writable special condition storage address for storage of character representations in response to said select/store key,
said system control means being thereafter responsive to the input of said index character and to the set condition of said special condition flag to derive internal control signals for controlling the addressing of said special condition storage at said indexed address, the retrieval of said stored selected character representations and operation signals and for use in the to said system control means for control of said system.

8. In a text-editing system having
a keyboard providing a plurality of manually actuated alpha-numeric character keys, and a plurality of manually actuated text-modifying operation keys,
signal input means coupled to said character and operation keys for inputting to said system an interrupt signal and a key-specific signal in response to actuation of any one of said character and operation keys,
input buffer storage connected to said signal input means for holding an input said key-specific signal, writable text storage,
display means for display of visual representations of characters corresponding to said alpha-numeric character keys,
display control means connected to said display means and having writable display storage,
a control storage storing groups of microinstructions,
system control means including decoding means responsive to said interrupt signal for fetching from said input buffer storage and decoding a said input signal and deriving therefrom internal control signals,
said system control means further comprising
address control and read/write control means connected to said text storage, said display storage, and said control storage, and being responsive to said derived internal control signals for controlling the addressing, reading and writing of said text storage, said display storage, and said control storage, and
processor means connected to said control storage and responsive to internal control signals derived from said text-modifying operation key-specific signals for operating according to accessed said groups of microinstructions to carry out operations specified by said text-modifying operation keys, and connected to said address control and read-write control means for modifying said text storage and said display storage in accordance with said operations,
that improvement wherein
said keyboard further provides
a special input condition key, said signal input means being responsive thereto to provide an interrupt signal to said decoding means and a special input condition signal to said input buffer storage, and
said system further comprises
key-name storage containing a set of displayable key-name representations and a set of corresponding text-modifying operation key-specific signals, said address control and read/write control means being further connected to said key-name storage for addressing elements of said sets, and
a special condition flag register for storing a special condition flag,
said system control means being responsive to a said special input condition signal to set said special condition flag,
said decoding means being responsive to a key-specific signal corresponding to one of said text-modifying operations and to the set condition of said special condition flag to derive internal control signals for controlling said address control and read/write control means to address said stored set of key-name representations to access a key-name representation corresponding to said operation, and to store said key-name representation into said text storage and said display storage.

9. In a text-editing system having
a keyboard providing a plurality of manually actuated alpha-numeric character keys, and a plurality of manually actuated text-modifying operation keys including an underscore key,
signal input means coupled to said character and operation keys for inputting to said system an interrupt signal and a key-specific signal in response to actuation of any one of said character and operation keys,
input buffer storage connected to said signal input means for holding an input said key-specific signal, writable text storage, display means for display of visual representations of characters corresponding to said alpha-numeric character keys, display control means connected to said display means and having writable display storage, a control storage storing groups of microinstructions, system control means comprising decoding means responsive to said interrupt signal for fetching from said input buffer storage and decoding a said input signal and deriving therefrom internal control signals, address control and read/write control means connected to said text storage, said display storage, and said control storage, and being responsive to said derived internal control signals for controlling the addressing, reading and writing of said text storage, said display storage, and said control storage, and processor means connected to said control storage for operating according to accessed said groups of microinstructions to carry out operations specified by said text-modifying operation keys, and connected to said address control and read/write control means for modifying said text storage and said display storage in accordance with said operations, said system control means providing current position storage and being responsive to said input signals for updating the content of said current position storage, said system control means being responsive to a character key-specific signal and to the content of said current position storage to derive internal control signals for addressing said text storage and said display storage at a current position address and writing a corresponding character representation therein, said system control means being responsive to said key-specific signal corresponding to actuation of said underscore key and to the content of said current position storage to derive internal control signals for addressing said text storage and said display storage at a current position address and for modifying the said character representation stored at said address, said display control means being responsive to said modified character representation for displaying said character in underscored format, that improvement wherein said keyboard further provides a special input condition key, said signal input means being responsive thereto to provide an interrupt signal to said decoding means and a special input condition signal to said input buffer storage, and a select/store key, said signal input means being coupled thereto for inputting an interrupt signal and a select/store signal to said system, said system further comprising writable special condition storage connected to said system control means, read-only key-name storage containing a set of displayable key-name representations each corresponding to a said text-modifying operation key and each composed of a plurality of character representations, said address control and read/write control means being further connected to said key-name storage for addressing elements of said set, and a special condition flag register for storing a special condition flag, said system control means being responsive to a said special input condition signal to set said special condition flag, said system control means being responsive to a signal corresponding to one of said text-modifying operations and to the set condition of said special condition flag to derive internal control signals for controlling said address control and read/write control means to address said stored set of key-name representations to access a said displayable key-name representation corresponding to said operation, and to store said key-name representation into said text storage and said display storage, said system control means being responsive to said select/store signal to derive internal control signals for addressing said text storage and retrieving stored character representations and key-name representations therefrom, said system control means being responsive to a said retrieved modified character representation to derive internal control signals for selecting and storing said character representation in said writable special condition storage, said system control means being further responsive to a said retrieved key-name representation composed of modified character representations to address said key-name storage and retrieve a corresponding text-modifying operation signal therefrom and to store said retrieved signal in said writable special condition storage.

10. The improvement of claim 9, wherein said system further comprises a writable index of said special condition storage, said system control means being responsive to particular character key-specific signals defining an index character, retrieved from said writable text storage responsive to said select/store key, to derive internal control signals for controlling said address control and read/write control means to store said index character into said index in association with the indexed writable special condition storage address of said selected character representations and operation signals, said system control menas being thereafter responsive to the input of said index character and to the set condition of said special condition flag to derive internal control signals for controlling said address control and read/write control means to address said special condition storage at said indexed address, to retrieve said stored selected character representations and operation signals and to apply them to said decoding means for control of said system.

* * * * *

UNITED STATES PATENT AND TRADEMARK OFFICE
CERTIFICATE OF CORRECTION

PATENT NO. : 4,247,906

DATED : January 27, 1981

INVENTOR(S) : Daniel W. Corwin et al.

It is certified that error appears in the above-identified patent and that said Letters Patent are hereby corrected as shown below:

Column 1, line 21, "may" should be --must--;
Column 5, line 50, "cathode-ray screen" should be --cathode-ray tube screen--;
Column 10, line 27, "single" should be underscored;
lines 28-29, "sequence" should be underscored;
Column 13, line 62, "into" should be --onto--;
Column 16, line 35, "special input mode" should be underscored;
line 67, "test" should be --text--;
Column 18, lines 20-21, "performing" should be underscored;
line 21, "not" should be underscored;
line 45, "(a)(-INSERT-)Massachusetts(-EXECUTE-)" should be underscored;
line 53, "(a)(-INSERT-)Massachusetts(-EXECUTE-)" should be underscored;
line 64, "(a)" should be against the left margin;
line 65, "(-INSERT-)Massachusetts(-EXECUTE-)" should be underscored;
line 68, "pesent" should be --present--;
Column 20, line 24, "selected" should be underscored;
Column 25, line 51, "the to said" should be --the said--;

Signed and Sealed this

Fifteenth Day of September 1981

[SEAL]

Attest:

GERALD J. MOSSINGHOFF

Attesting Officer    Commissioner of Patents and Trademarks